US012005676B2

(12) United States Patent
Usui et al.

(10) Patent No.: US 12,005,676 B2
(45) Date of Patent: Jun. 11, 2024

(54) COMPOSITE OF METAL AND CARBON-FIBER-REINFORCED PLASTIC AND METHOD FOR MANUFACTURING COMPOSITE OF METAL AND CARBON-FIBER-REINFORCED PLASTIC

(71) Applicant: NIPPON STEEL CORPORATION, Tokyo (JP)

(72) Inventors: Masafumi Usui, Tokyo (JP); Masaharu Ibaragi, Tokyo (JP); Noriyuki Negi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 928 days.

(21) Appl. No.: 16/965,944

(22) PCT Filed: Apr. 2, 2019

(86) PCT No.: PCT/JP2019/014691
§ 371 (c)(1),
(2) Date: Jul. 29, 2020

(87) PCT Pub. No.: WO2019/202975
PCT Pub. Date: Oct. 24, 2019

(65) Prior Publication Data
US 2021/0039356 A1  Feb. 11, 2021

(30) Foreign Application Priority Data
Apr. 18, 2018 (JP) .................................. 2018-080103

(51) Int. Cl.
*B32B 15/14* (2006.01)
*B29C 43/20* (2006.01)
(Continued)

(52) U.S. Cl.
CPC ............ *B32B 15/14* (2013.01); *B29C 43/203* (2013.01); *B29C 70/42* (2013.01); *B29C 70/683* (2013.01);
(Continued)

(58) Field of Classification Search
CPC ......... B32B 15/08; B32B 15/14; B32B 15/18; B32B 15/20; B32B 5/02; B32B 5/022;
(Continued)

(56) References Cited

FOREIGN PATENT DOCUMENTS

| JP | 6057330 B2 | 1/2017 |
| WO | WO 2015/119064 A1 | 8/2015 |

OTHER PUBLICATIONS

Linseis—LFA—Aluminum oxide thermal diffusivity/conductivity, accessed online on May 25, 2023.*
(Continued)

*Primary Examiner* — Camie S Thompson
(74) *Attorney, Agent, or Firm* — Birch, Stewart, Kolasch & Birch, LLP

(57) ABSTRACT

A composite of metal and carbon-fiber-reinforced plastic according to the present invention comprising a predetermined metal member, a resin layer positioned at a surface of at least part of the metal member and containing an inorganic filler having a thermal conductivity of 20 W/(m·K) or more, and carbon fiber reinforced plastic positioned on the resin layer and containing a predetermined matrix resin and carbon reinforcing fiber present in the matrix resin, the carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, a content of the inorganic filler in the resin layer being 10 to 45 vol % in range with respect to a total volume of the resin layer, a number density of the
(Continued)

inorganic filler present in a region of a width X μm from an interface of the resin layer and the carbon fiber reinforced plastic in a direction of the resin layer being 300/mm² or more, where X μm is an average particle size of the inorganic filler.

13 Claims, 3 Drawing Sheets

(51) Int. Cl.
- B29C 70/42 (2006.01)
- B29C 70/68 (2006.01)
- B29C 70/78 (2006.01)
- B29C 70/88 (2006.01)
- B29K 105/08 (2006.01)
- B29K 307/04 (2006.01)
- B29K 705/00 (2006.01)
- B32B 5/02 (2006.01)
- B32B 15/18 (2006.01)
- B32B 15/20 (2006.01)
- B32B 37/06 (2006.01)
- B32B 37/10 (2006.01)
- B32B 37/18 (2006.01)

(52) U.S. Cl.
CPC ............ *B29C 70/78* (2013.01); *B29C 70/88* (2013.01); *B32B 5/02* (2013.01); *B32B 5/022* (2013.01); *B32B 15/18* (2013.01); *B32B 15/20* (2013.01); *B32B 37/06* (2013.01); *B32B 37/10* (2013.01); *B32B 37/182* (2013.01); *B29K 2105/0872* (2013.01); *B29K 2307/04* (2013.01); *B29K 2705/00* (2013.01); *B29K 2995/0013* (2013.01); *B32B 2255/06* (2013.01); *B32B 2255/205* (2013.01); *B32B 2255/26* (2013.01); *B32B 2255/28* (2013.01); *B32B 2260/021* (2013.01); *B32B 2260/046* (2013.01); *B32B 2262/106* (2013.01); *B32B 2264/107* (2013.01); *B32B 2264/303* (2020.08); *B32B 2305/076* (2013.01); *B32B 2305/10* (2013.01); *B32B 2305/28* (2013.01); *B32B 2305/30* (2013.01); *B32B 2307/302* (2013.01); *B32B 2309/02* (2013.01); *B32B 2309/04* (2013.01); *B32B 2309/125* (2013.01); *B32B 2311/20* (2013.01); *B32B 2311/24* (2013.01); *B32B 2311/30* (2013.01); *B32B 2313/04* (2013.01); *B32B 2315/02* (2013.01); *B32B 2323/10* (2013.01); *B32B 2363/00* (2013.01); *B32B 2457/10* (2013.01); *B32B 2605/08* (2013.01)

(58) Field of Classification Search
CPC ....... B32B 37/10; B32B 37/182; B32B 37/06; B32B 2264/303; B32B 2255/06; B32B 2255/205; B32B 2255/26; B32B 2255/28; B32B 2260/021; B32B 2260/046; B32B 2260/106; B32B 2260/107; B32B 2305/076; B32B 2305/10; B32B 2305/28; B32B 2305/30; B32B 2307/302; B32B 2309/02; B32B 2309/04; B32B 2309/125; B32B 2311/24; B32B 2311/30; B32B 2313/04; B32B 2315/02; B32B 2323/10; B32B 2363/00; B32B 2457/10; B32B 2605/08; B32B 7/12; B29C 43/203; B29C 70/42; B29C 70/683; B29C 70/78; B29C 70/88; B29K 2105/0872; B29K 2307/04; B29K 2705/00; B29K 2995/0013; B29K 2995/06
USPC ...... 428/35.8, 35.9, 36.4, 113, 418; 442/378
See application file for complete search history.

(56) References Cited

OTHER PUBLICATIONS

Huang et al., Prediction of the transverse thermal conductivity of pitch-based carbon fibers, Journal of Composite Materials, 2014, vol. 48(11), 1383-1390.*

* cited by examiner

COMPOSITE OF METAL AND CARBON-FIBER-REINFORCED PLASTIC AND METHOD FOR MANUFACTURING COMPOSITE OF METAL AND CARBON-FIBER-REINFORCED PLASTIC

FIELD

The present invention relates to a composite of metal and carbon-fiber-reinforced plastic and a method for manufacturing a composite of metal and carbon-fiber-reinforced plastic.

BACKGROUND

In recent years, in automobiles, it is necessary to manage various heat. For example, to manage the heat generated from a battery of an electric vehicle or hybrid vehicle to secure the safety of the battery or battery life, in particular high heat transfer members have been gathering attention. Specifically, the practice has been to place a heat transfer sheet or copper heat pipe etc. at the side surface part or bottom surface part of the battery case to manage the heat generated from the battery.

As the above heat transfer sheet, from the viewpoint of lightening the weight of an automobile, a resin (silicone) sheet or other member has been used, but due to repeated vibration occurring at automobiles, there has been the problem of a drop in strength of the resin sheet. For this reason, as a light weight, high thermal conductivity member, in particular carbon fiber reinforced plastic using pitch-based carbon reinforcing fiber (below, also referred to as "pitch CFRP") has been gathering attention.

Pitch-based carbon reinforcing fiber, unlike PAN-based carbon reinforcing fiber, uses an easy graphitizable material as a raw material. A graphene sheet has a structure highly oriented in the fiber axial direction, so features an extremely high thermal conductivity in the fiber axial direction. However, pitch CFRP is extremely weak in compressive strength, so has the problem of a low flexural strength. With pitch CFRP alone, the cost also ends up increasing. Therefore, formation of a composite of CFRP and a metal material has been proposed like in the following PTL 1.

CITATIONS LIST

Patent Literature

[PTL 1] WO 2015/119064
[PTL 2] Japanese Patent No. 6057330

SUMMARY

Technical Problem

However, the inventors studied this and as a result learned that if applying the composite of a metal and CFRP of the above PTL 1 to a heat transfer member, the metal ends up corroding due to the potential difference between the metal and carbon reinforcing fiber. It became clear that the phenomenon called "electrolytic corrosion" occurs. In particular, pitch CFRP has a high electrical conductivity, so it is believed the amount of corrosion of the metal tends to increase.

To prevent the above such electrolytic corrosion, for example, the above PTL 2 proposes to place a nonwoven fabric having insulation ability at the interface of the metal and CFRP. However, in such a case, heat is not transferred between the metal and CFRP and the heat transfer ability ends up falling. Further, if placing such a nonwoven fabric, the adhesion between the metal and CFRP cannot be secured, so the flexural strength may also be inferior.

Therefore, the present invention was made in consideration of the above problem. The object of the present invention is to provide a composite of metal and carbon-fiber-reinforced plastic maintaining the adhesion and heat transfer between metal and carbon fiber reinforced plastic while preventing electrolytic corrosion able to occur at the interface of the metal and carbon fiber reinforced plastic and to provide a method for manufacturing a composite of metal and carbon-fiber-reinforced plastic.

Solution To Problem

The above such electrolytic corrosion occurs in the state where the metal and the carbon reinforcing fiber in the CFRP directly contact each other. If water or another conductive substance is present at the interface between the metal and CFRP in that state, the metal and CFRP are electrically connected and corrosion occurs in the metal with its low base potential. Therefore, the inventors engaged in intensive studies to solve the above problem. As a result, they obtained the finding that by providing a resin layer mainly comprised of a predetermined resin between the metal and CFRP and making it function as a bonding layer, by preventing direct contact and the entry of water or other conductive substance between the metal and carbon reinforcing fiber in the CFRP and by including in such a resin layer an inorganic filler having a predetermined thermal conductivity and extremely low in electrical conductivity (high in electrical resistivity) and adjusting its content, and by controlling the number density of inorganic filler in the resin layer near the interface of the resin layer and CFRP, it becomes possible to improve the heat transfer between the metal and CFRP while preventing electrolytic corrosion and, further, improve the flexural strength.

Further, the inventors studied a method for manufacture for obtaining the above such composite of metal and carbon-fiber-reinforced plastic. As a result, they were able to obtain the findings that by controlling the viscosity of the resin, it is possible to improve the coatability on metal, further, by performing a two-stage hot pressing process at a predetermined temperature, pressure, and time, it becomes possible to raise the number density of the inorganic filler near the interface with the CFRP layer in the resin layer, and, as a result, possible to improve the heat transfer between the metal and CFRP while preventing electrolytic corrosion, further, possible to improve the flexural strength, whereby the above such composite of metal and carbon-fiber-reinforced plastic is obtained.

The gist of the present invention completed based on the above findings is as follows: [1] A composite of metal and carbon-fiber-reinforced plastic comprising a predetermined metal member, a resin layer positioned at a surface of at least part of the metal member and containing an inorganic filler having a thermal conductivity of 20 W/(m·K) or more, and carbon fiber reinforced plastic positioned on the resin layer and containing a predetermined matrix resin and carbon reinforcing fiber present in the matrix resin, the carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, a content of the inorganic filler in the resin layer being 10 to 45 vol % in range with respect to a total volume of the resin layer, a number density of the inorganic filler present in a region of a width X μm from an interface of the resin layer and the carbon fiber reinforced plastic in a direction of the resin layer being 300/mm$^2$ or more where X μm is an average particle size of the inorganic filler.

[2] The composite of metal and carbon-fiber-reinforced plastic according to [1], wherein the resin layer is mainly comprised of the same type of resin as the matrix resin.

[3] The composite of metal and carbon-fiber-reinforced plastic according to [1] or [2], wherein the resin layer has a thermosetting resin as a main component.

[4] The composite of metal and carbon-fiber-reinforced plastic according to any one of [1] to [3], wherein the inorganic filler is any one of AlN, $Si_3N_4$, SiC, or $Al_2O_3$.

[5] The composite of metal and carbon-fiber-reinforced plastic according to any one of [1] to [4], wherein a ratio of the metal member with respect to a total volume of the composite of metal and carbon-fiber-reinforced plastic is 9 to 65 vol % in range, a ratio of the carbon fiber reinforced plastic is 20 to 90 vol % in range, a ratio of the resin layer is 1 to 25 vol % in range, and a total of the ratios of the metal member, the carbon fiber reinforced plastic, and the resin layer is 100 vol %.

[6] The composite of metal and carbon-fiber-reinforced plastic according to any one of [1] to [5], wherein an average particle size of the inorganic filler is 1 to 100 μm in range, and a thickness of the resin layer is 20 to 300 μm in range.

[7] The composite of metal and carbon-fiber-reinforced plastic according to [1], wherein the carbon reinforcing fiber is the pitch-based carbon reinforcing fiber, and a fiber content of the pitch-based carbon reinforcing fiber is 20 to 70 vol % with respect to a total volume of the carbon fiber reinforced plastic.

[8] The composite of metal and carbon-fiber-reinforced plastic according to [1], wherein the carbon reinforcing fiber is the PAN-based carbon reinforcing fiber, and a fiber content of the PAN-based carbon reinforcing fiber is 20 to 65 vol % with respect to a total volume of the carbon fiber reinforced plastic.

[9] The composite of metal and carbon-fiber-reinforced plastic according to any one of [1] to [8], wherein the metal member is a ferrous material.

[10] The composite of metal and carbon-fiber-reinforced plastic according to any one of [1] to [9], wherein the composite is used for manufacturing a heat transfer member, and the carbon fiber reinforced plastic is used as a heat transfer path transferring heat from the metal member side.

[11] A method for manufacturing a composite of metal and carbon-fiber-reinforced plastic comprising coating a surface of a predetermined metal member with a treatment solution which contains a predetermined resin material and inorganic filler having a thermal conductivity of 20 W/(m·K) or more and which has a viscosity at 20 to 40° C. of 1 to 30 Pa·S, placing a carbon fiber reinforced plastic prepreg which contains a predetermined matrix resin and carbon reinforcing fiber present in the matrix resin on the metal member after being coated with the treatment solution, the carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, to obtain a stacked assembly, performing a first hot pressing step of applying to the stacked assembly 0.5 to 2.0 MPa, in pressure at a predetermined range of treatment temperature for 30 to 60 minutes, performing a second hot pressing step of applying to the stacked assembly after the first hot pressing step 0.5 to 2.0 MPa in pressure at a predetermined range of treatment temperature for 30 to 120 minutes, and making a content of the inorganic filler in the treatment solution 10 to 45 vol % in range with respect to a total volume of the treatment solution, a treatment temperature of the first hot pressing step being (Tg-80) to (Tg-50)° C. in range in the case where the resin material in the treatment solution is a noncrystalline thermosetting resin, where Tg [° C.] is a glass transition temperature of the resin after curing, and being (Tm) to (Tm+20)° C. in range in the case where the resin material in the treatment solution is a crystalline thermosetting resin, where Tm [° C.] is a melting point of the crystalline resin, a treatment temperature of the second hot pressing step being (Tg-20) to (Tg+50)° C. in range in the case where the resin material in the treatment solution is a noncrystalline thermosetting resin and being (Tm+25) to (Tm+50)° C., in range in the case where the resin material in the treatment solution is a crystalline thermosetting resin.

A method for manufacturing a composite of metal and carbon-fiber-reinforced plastic comprising coating a surface of a predetermined metal member with a resin sheet or a treatment solution which has a viscosity at 20 to 40° C. of 1 to 30 Pa·S, the resin sheet or the treatment solution contains a predetermined resin material and inorganic filler having a thermal conductivity of 20 W/(m·K) AK) or more, placing a carbon fiber reinforced plastic prepreg which contains a predetermined matrix resin and carbon reinforcing fiber present in the matrix resin on the metal member after placing the resin sheet or the treatment solution, the carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, to obtain a stacked assembly, performing a first hot pressing step of applying to the stacked assembly 0.5 to 2.0 MPa in pressure at a predetermined range of treatment temperature for 30 to 60 minutes, performing a second hot pressing step of applying to the stacked assembly after the first hot pressing step 0.5 to 2.0 MPa in pressure at a predetermined range of treatment temperature for 30 to 120 minutes, and making a content of the inorganic tiller in the resin sheet or the treatment solution 10 to 45 vol % in range with respect to a total volume of the resin sheet or the treatment solution, a treatment temperature of the first hot pressing step being a temperature lower than a decomposition temperature and (Tg+100) to (Tg+200)° C. in temperature range in the case where the resin material in the resin sheet or in the treatment solution is a noncrystalline thermoplastic resin, where Tg [° C.] is a glass transition temperature of said resin material, and being a temperature lower than a decomposition temperature and (Tm) to (Tm+50)° C. in temperature range in the case where the resin material in the resin sheet or in the treatment solution is a crystalline thermoplastic resin, where Tm [° C.] is a melting point of the crystalline thermoplastic resin, a treatment temperature of the second hot pressing step being Tg to (Tg+150)° C. in range in the case where the resin material in the resin sheet or in the treatment solution is a noncrystalline thermoplastic resin and Tm to (Tm+20)° C. in range in the case where the resin material in the treatment solution is a crystalline thermoplastic resin and being a temperature lower than a decomposition temperature, where Tm [° C.] is a melting point of the crystalline thermoplastic resin.

[13] The method for manufacturing a composite of metal and carbon-fiber-reinforced plastic according to [11] or [12], further comprising using inorganic filler having an average particle size of 1 to 100 μm in range and making an amount of deposition of the treatment solution 25 to 630 g/m² in range.

Advantageous Effects of Invention

As explained above, according to the present invention, it becomes possible to maintain the adhesion and heat transfer between metal and carbon fiber reinforced plastic while preventing electrolytic corrosion liable to occur at the interface of the metal and carbon fiber reinforced plastic. Further, by improvement of the adhesion of the metal and carbon fiber reinforced plastic, the composite of metal and carbon-fiber-reinforced plastic is also improved in flexural strength.

DESCRIPTION OF EMBODIMENTS

Below, preferred embodiments of the present invention will be explained in detail while referring to the attached drawings. Note that, in the Description and drawings, component elements having substantially the same functions and configurations are assigned the same notations and overlapping explanations are omitted.

Regarding Metal and Carbon-Fiber-Reinforced Plastic Composite

First, referring to FIG. 1A to FIG. 4, a composite of metal and carbon-fiber-reinforced plastic according to the present embodiment (below, abbreviated as "metal-CFRP composite") will be explained in detail.

Figure 1A:
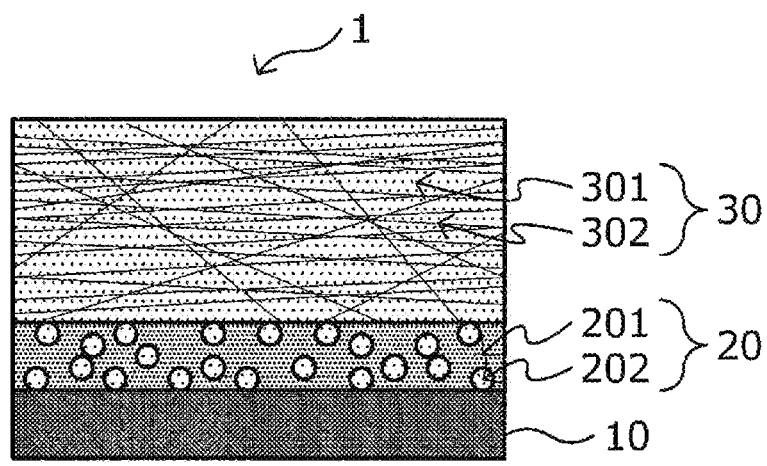
FIG. 1A is an explanatory view schematically showing one example of the structure of a composite of metal and carbon-fiber-reinforced plastic according to an embodiment of the present invention.
Figure 1B:
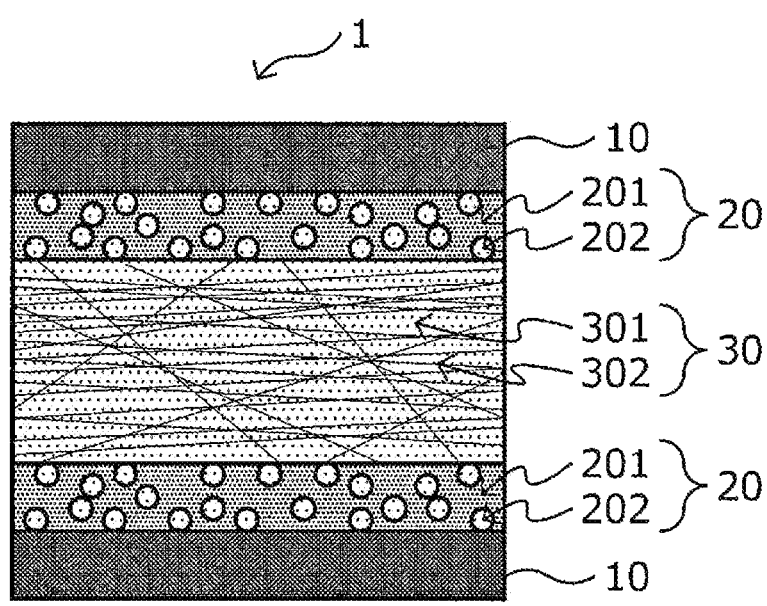
FIG. 1B is an explanatory view schematically showing one example of the structure of a composite of metal and carbon-fiber-reinforced plastic according to the same embodiment.
Figure 2:
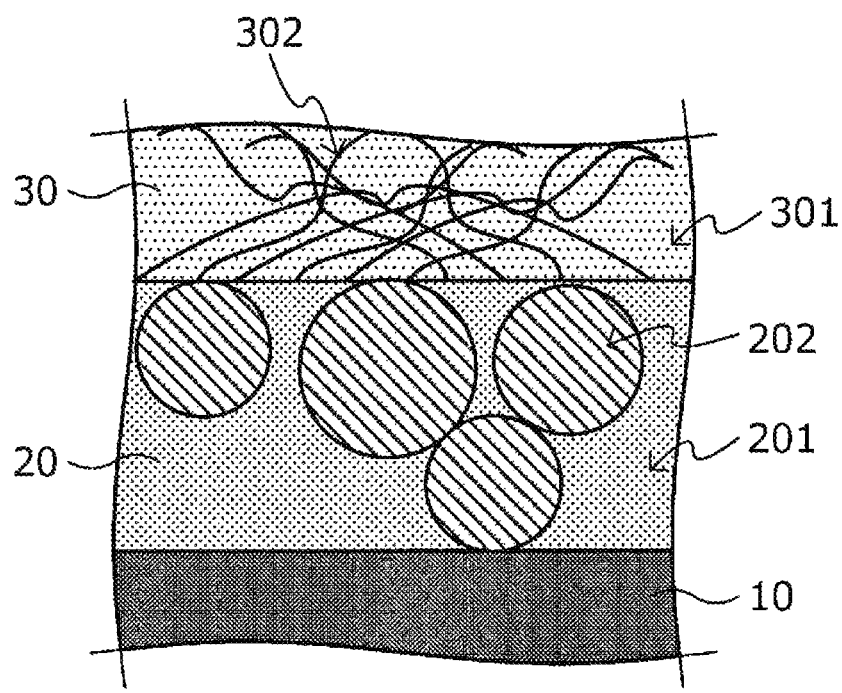
FIG. 2 is an explanatory view for explaining a composite of metal and carbon-fiber-reinforced plastic according to the same embodiment.
Figure 3:
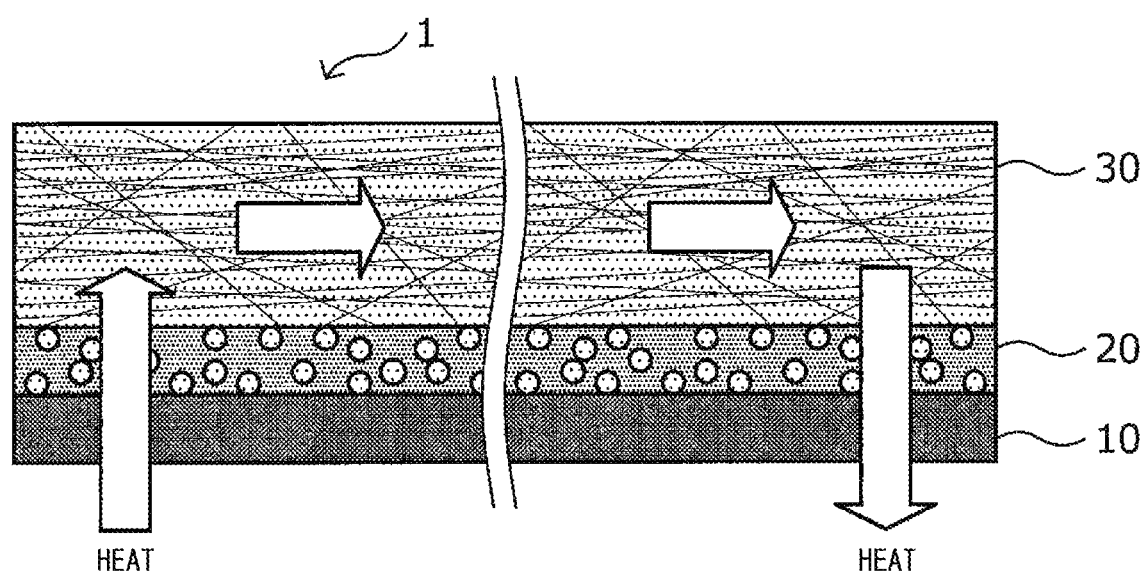
FIG. 3 is an explanatory view for explaining a composite of metal and carbon-fiber-reinforced plastic according to the same embodiment.
Figure 4:
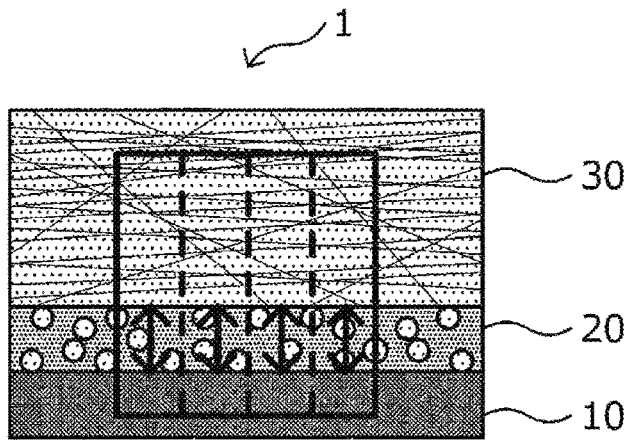
FIG. 4 is an explanatory view for explaining a method of measurement of thickness.

FIG. 1A and FIG. 1B are explanatory views schematically showing one example of the structure of a metal-CFRP composite of an embodiment of the present invention, while FIG. 2 and FIG. 3 are explanatory views for explaining a metal-CFRP composite according to the present embodiment. FIG. 4 is an explanatory view for explaining a method of measurement of thickness.

The metal-CFRP composite 1 according to the present embodiment, as schematically shown in FIG. 1A, is provided with a metal member 10, a resin layer 20 positioned on the surface of the metal member 10, and a CFRP layer 30 as one example of carbon fiber reinforced plastic according to the present embodiment positioned on the surface of the resin layer 20. Therefore, the metal-CFRP composite 1 is comprised of the metal member 10, resin layer 20, and CFRP layer 30 formed into a composite. Here, "formed into a composite" means the metal member 10, resin layer 20, and CFRP layer 30 joined with each other (bonded together) to form a single member. Further, "form a single member" means the metal member 10, resin layer 20, and CFRP layer 30 acting as a single member when being worked and being deformed. Alternatively, the metal-CFRP composite 1 may be comprised of only the metal member 10, resin layer 20, and CFRP layer 30.

In the metal-CFRP composite 1 according to the present embodiment, the resin layer 20 mainly contains a predetermined resin composition 201 and an inorganic filler 202 having a thermal conductivity of 20 W/(m·K) or more. The content of the inorganic filler 202 in the resin layer 20 is 10 to 45 vol % in range with respect to the total volume of the resin layer 20. Further, the CFRP layer 30 has a predetermined matrix resin 301 and carbon reinforcing fiber 302 contained in such a matrix resin 301.

Here, the "reinforcing fiber" is a material which forms a composite with a material different from itself (for example, a resin material) and thereby improves the mechanical properties of the material different from itself. Further, the "carbon reinforcing fiber" is a reinforcing fiber comprised of 90 mass % or more of a carbon ingredient. Further, the "carbon fiber reinforced plastic" is a composite material of carbon reinforcing fiber and a matrix resin.

Further, the metal-CFRP composite 1 according to the present embodiment is not limited to the example schematically shown in FIG. 1A. For example, as schematically shown in FIG. 1B, it may also have a so-called sandwiched structure where resin layers 20 are positioned on both surfaces of the CFRP layer 30 and metal members 10 are positioned on the surfaces of the respective resin layers 20 at the opposite sides to the CFRP layer 30 layers.

In the metal-CFRP composite 1 according to the present embodiment, by the above such resin layer 20 being present between the metal member 10 and CFRP layer 30 and functioning as a bonding layer, direct contact between the metal member 10 and the carbon reinforcing fiber 302 in the CFRP layer 30 and penetration of water or another conductive substance at the interface between the metal member 10 and CFRP layer 30 are prevented. Due to this, electrolytic corrosion due to direct contact between the metal member 10 and carbon reinforcing fiber 302 can be effectively suppressed. Further, due to the presence of the above such inorganic filler 202 having above such thermal conductivity in the resin layer 20 in the above content, heat transfer between the metal and the CFRP, that is, heat transfer in the thickness direction (vertical direction in FIGS. 1A and B) can be improved.

The metal-CFRP composite 1 according to the present embodiment, as explained below, is manufactured by hot press bonding a metal member 10 coated with a treatment solution forming the resin layer 20 and a CFRP prepreg forming the CFRP layer 30. As explained above, by the inorganic filler 202 being present in the resin layer 20 by such a content and by going through the two-stage hot pressing process such as explained below, after hot press bonding, the carbon reinforcing fiber 302 present in the CFRP layer 30 and the inorganic filler 202 present in the resin layer 20 partially contact as schematically shown in FIG. 2. This occurs because by hot pressing at the first hot pressing step by a predetermined temperature, pressure, and time, the resin of the resin layer 20 and CFRP layer 30 falls in viscosity and the inorganic filler 202 in the resin layer 20 and the carbon reinforcing fiber 302 of the CFRP layer 30 contact each other. Further, by performing the second hot pressing step in this state at a predetermined temperature, pressure, and time, the resin layer in the CFRP proceeds to cure in the state with the inorganic filler 202 and carbon reinforcing fiber 302 in contact, so it is possible to obtain a composite provided with heat transfer ability and strength. The inorganic filler 202 present in the resin layer 20 has the above such thermal conductivity, so is good in conductivity of heat. Further, the carbon reinforcing fiber 302 in the CFRP layer 30 is also good in conductivity of heat. For this reason, in the metal-CFRP composite 1 according to the present embodiment, even if the resin layer 20 is present between the metal member 10 and CFRP layer 30, the heat transferred from the metal member 10 side can be efficiently transferred to the CFRP layer 30 and, further, the heat can be efficiently transferred from the CFRP layer 30 side to the metal member 10.

As a result, the thermal conductivity of the metal-CFRP composite 1 according to the present embodiment as a whole becomes an excellent value and the metal-CFRP composite 1 as a whole becomes good in conductivity of heat. Due to this, in the metal-CFRP composite 1 according to the present embodiment, as schematically shown in FIG. 3, the heat transferred from the metal member 10 side is transferred through the resin layer 20 to the CFRP layer 30, is transferred using the CFRP layer 30 as a heat transfer path, and is taken out from the metal member 10 at the desired position. For this reason, the metal-CFRP composite 1 according to the present embodiment can be suitably used for manufacturing various types of heat transfer members (for example members near battery cases etc.)

Below, the various component elements of the metal-CFRP composite 1 and the rest of the configuration will be explained in detail.

Regarding Metal Member 10

The material, shape, etc. of the metal member 10 are not particularly limited, but the shape is preferably a sheet shape. As the material of the metal member 10, for example, a ferrous metal, titanium, aluminum, magnesium, and alloys of the same etc. may be mentioned. Here, as an example of the alloy, for example, an iron-based alloy (including stainless steel), Ti-based alloy, Al-based alloy, Mg-based alloy, etc. may be mentioned. The material of the metal member 10 is preferably a ferrous material (steel material), iron-based alloy, titanium, and aluminum. A ferrous metal with a modulus of elasticity higher than other types of metal is more preferable. Note that, if using a ferrous material as the metal member 10, since a ferrous material is relatively easily corroded, it is extremely advantageous to provide the resin layer 20 according to the present embodiment to inhibit electrolytic corrosion. As such ferrous material, for example, as thin type steel sheets used for automobiles, ferrous materials prescribed by the Japan Industrial Standard (JIS) etc. such as cold rolled steel sheet for general use, drawing use, or ultra deep drawing use, cold rolled high strength steel sheet with improved shapeability for automobile use, hot rolled steel sheet for general use or working use, hot rolled steel sheet for automobile structural use, and hot rolled high strength steel sheet with improved shapeability for automobile structural use. Carbon steel, alloy steel, high strength, etc. used for general structural use or machine structural use may also be mentioned as ferrous material limited to sheet shapes. Note that, if the metal member 10 is a sheet shape, these may also be further shaped.

The ferrous material may be treated by any surface treatment. Here, as the "surface treatment", for example, galvanization and aluminum plating or other various types of plating, chromate treatment, nonchromate treatment, and other chemical treatment and sandblasting or other physical or chemical etching or other chemical surface roughening treatment may be mentioned, but the invention is not limited to these. Further, alloying of the plating or several types of surface treatment may be applied. As the surface treatment, treatment aimed at imparting at least rust-proofing is preferably performed.

In particular, among the ferrous materials, a plated steel material which is subjected to plating treatment is preferable since it is excellent in corrosion resistance. As a plated steel material particularly preferable as the metal member 10, for example, a hot dip galvanized steel sheet, an electrogalvannealed steel sheet, hot dip galvannealed steel sheet, zinc-aluminum-magnesium alloy plated steel sheet, zinc-nickel alloy plated steel sheet, nickel plated steel sheet, aluminum plated steel sheet, etc. may be mentioned.

Here, to improve the adhesion of the resin layer 20, the surface of the metal member 10 is preferably treated by a primer. As the primer used in this treatment, for example, a silane coupling agent or triazine triol derivative is preferable. As a silane coupling agent, an epoxy-based silane coupling agent or amino-based silane coupling agent or imidazole silane compound may be illustrated. As the triazine thiol derivative, 6-diallyl amino-2,4-dithiol-1,3,5-triazine, 6-methoxy-2,4-dithiol-1,3,5-triazine monosodium, 6-propyl-2,4-dithiolamino-1,3,5-triazine monosodium, 2,4, 6-trithiol-1,3,5-triazine, etc. may be mentioned.

Above, the metal member 10 according to the present embodiment was explained in detail.

Regarding Resin Layer 20

The resin layer 20 according to the present embodiment functions as a bonding layer for bonding the metal member 10 and CFRP layer 30 in an excellent state. Such a resin layer 20 includes a predetermined resin composition 201 and inorganic filler 202 having the thermal conductivity referred to earlier. Alternatively, the resin layer 20 may be comprised of a predetermined resin composition 201 and inorganic filler 202 having a thermal conductivity of 20 W/(m·K) or more.

The thickness of the resin layer 20 according to the present embodiment is not particularly limited, but, for example, may be 20 to 300 μm. By making the thickness of the resin layer 20 to 300 μm in range, it is possible to prevent electrolytic corrosion while bonding the metal member 10 and CFRP layer 30 in an excellent state and possible to sufficiently secure workability (flexural strength). The thickness of the resin layer 20 may, for example, be 30 μm or more, 40 μm or more, 50 μm or more, or 60 μm or more and, further, may be 250 μm or less, 200 μm or less, or 150 μm or less. Therefore, the thickness of the resin layer 20 is preferably 30 to 200 μm, more preferably 50 to 150 μm. The thickness of the resin layer 20, as explained in detail below, can be measured based on the optical method of JIS K 5600-1-7, 5.4.

Regarding Resin Composition 201

The resin composition 201 forming the resin layer 20 is not particularly limited. It may be a composition mainly comprised of various known types of thermosetting resins and may be a composition mainly comprised of various known types of thermoplastic resins. Here, from the viewpoint of securing adhesion between the resin layer 20 and CFRP layer 30, the resin layer 20 and the matrix resin 301 in the CFRP layer 30 are preferably the same types of or the same resins or types of resins with similar ratios of polar groups contained in the polymer. Further, the resin composition 201 forming the resin layer 20 may be a crystalline resin or may be a noncrystalline resin.

Here, the "same resins" means comprised of the same components and having the same ratios of composition, the "same types of resins" means comprised of the same main components but possibly having different ratios of composition. Among the "same types of resins", the "same resins" are included. Further, the "main component" means a component contained in 50 pts.mass or more in 100 pts.mass of the total resin components. Note that, "resin components" include thermoplastic resins and thermosetting resins, but cross-linking agents and other non-resin components are not included.

Further, a "crystalline resin" is a resin in which a melting point Tm is observed when measuring a melting point using differential scanning calorimetry (DSC) or differential thermal analysis (DTA). A "noncrystalline resin" is a resin in which an exothermic peak accompanying crystallization is not observed and only a glass transition temperature Tg is observed when measuring a melting point using differential scanning calorimetry or differential thermal analysis.

For the melting point and glass transition temperature, values found by DSC based on JIS-K7121 are used. That is, in measurement of the melting point, a test piece of about 5 mg is set in the apparatus and heated to a temperature about 30° C. higher than the time of the melting peak at a heating speed of 10° C./min to obtain a DSC curve. The temperature of the vertex of the melting peak is made the melting point Tm. Further, the glass transition temperature is similarly found by setting a test piece of about 10 mg in the apparatus and heating it to a temperature about 30° C. higher than the time of the end of transition at a heating speed of 20° C./min to obtain a DSC curve. The temperature of the point where a line at an equal distance in the ordinate direction from the extension line of each baseline and the curve of the part of step-shaped change of glass transition intersect are cross is made the glass transition temperature Tg.

By making the resin composition 201 forming the resin layer 20 and the matrix resin 301 in the CFRP layer 30 the same types of resins, it is possible to make the melting point Tm or glass transition temperature Tg relatively close whereby, at the time of hot press bonding, the two resins melt or soften and penetration of the carbon reinforcing fiber 302 present in the CFRP layer 30 into the resin layer 20 becomes easier. As a result, a more excellent state of contact of the inorganic filler 202 and the carbon reinforcing fiber 302 can be easily obtained.

The resin composition 201 forming the resin layer 20, in the above way, can use either of a thermosetting resin and thermoplastic resin, but from the viewpoints of the mechanical strength and heat resistance of such a metal-CFRP composite 1, of the present embodiment, preferably the resin layer 20 is one having a thermosetting resin as its main component. The type of the thermosetting resin able to be used for the resin layer 20 is not particularly limited, but, for example, one or more resins selected from an epoxy resin, vinyl ester resin, phenol resin, and urethane resin can be used. For example, the resin composition 201 forming the resin layer 20 may contain 50 pts.mass or more, 60 pts.mass or more, 70 pts.mass or more, 80 pts.mass or more, 90 pts.mass or more, or 100 pts.mass of the above thermosetting resins in 100 pts.mass of the total resin components.

Further, the thermoplastic resin able to be used for the resin layer 20 is also not particularly limited, but, for example, one or more resins selected from a phenoxy resin, polyolefin and its acid-modified forms, polystyrene, polymethyl methacrylate, AS resin, ABS resin, polyethylene terephthalate or polybutylene terephthalate or other thermoplastic aromatic polyesters, polycarbonate, polyimide, polyamide, polyamideimide, polyether imide, polyether sulfone, polyphenylene ether and its modified forms, polyphenylene sulfide, polyoxy methylene, polyarylate, polyether ketone, polyether ether ketone, polyether ketone ketone, polypropylene, nylon, etc. may be used. Among the thermoplastic resins, from the viewpoints of both of the workability and strength, a phenoxy resin is particularly preferably used. For example, the resin composition 201 forming the resin layer 20 may contain 50 pts.mass or more, 60 pts.mass or more, 70 pts.mass or more, 80 pts.mass or more, 90 pts.mass or more, or 100 pts.mass of the abovementioned thermoplastic resin (for example phenoxy resin) in 100 pts.mass of the total resin components.

Regarding Inorganic Filler 202

The inorganic filler 202 present in the resin layer 20 according to the present embodiment has a 20 W/(m·K) or more thermal conductivity. If the thermal conductivity of the inorganic filler 202 is 20 W/(m·K) or more, an excellent thermal conductivity can be secured between the metal member 10 and CFRP layer 30. Further, the inorganic filler 202 may have a value of 30 W/(m·K) or more, 50 W/(m·K) or more, 70 W/(m·K) or more, 100 W/(m·K) or more, or 120 W/(m·K) or more. On the other hand, the upper limit of the thermal conductivity of the inorganic filler is not particularly prescribed, but as of the present time, no inorganic filler having a thermal conductivity of over 270 W/(m·K) and able to be suitably used has been found. 270 W/(m·K) has become the substantive upper limit value. Therefore, the thermal conductivity of the inorganic filler 202 is preferably 30 to 270 W/(m·K) in range, more preferably 120 to 270 W/(m·K) in range. Further, the inorganic filler 202 also contributes to insulation between the metal member 10 and the CFRP layer 30, therefore, suppression of electrolytic corrosion. Therefore, the inorganic filler 202 preferably has a high insulation ability, that is, a high electrical resistivity. For example, the electrical resistivity of the inorganic filler 202 at 20° C. is preferably $1.0 \times 10^{14}$ Ωcm or more.

The inorganic filler 202 according to the present embodiment is not particularly limited so long as having the above such thermal conductivity. Various known types of inorganic fillers can be used. As such inorganic fillers 202, for example, AlN (thermal conductivity: 120 to 270 W/(m·K)), $Si_3N_4$ (thermal conductivity: 30 to 80 W/(m·K)), SiC (thermal conductivity: 270 W/(m·K)), $Al_2O_3$ (thermal conductivity: 20 W/(m·K)), etc. may be mentioned. These inorganic fillers 202 have a high thermal conductivity and electrical resistivity and are suitable materials in realizing both heat transfer and insulation. As the inorganic filler 202 according to the present embodiment, single types of inorganic filler among the above inorganic fillers may be used alone or plurality of types of inorganic filler may be used combined.

Note that, the thermal conductivity of the inorganic filler 202 may be measured by a thermophysical microscope using the periodic heating and thermoreflectance method etc. That is, the surface of the sample is polished to a mirror finish, then an Mo thin film (thickness 100 nm) is applied and a heating laser (beam shape of elliptical shape, long axis 7 μm×short axis 5 μm, etc.) is used for periodic heating. The same surface is irradiated by a probe laser (beam shape of circular shape, diameter 3 μm) and the change in temperature at the sample surface is detected as a change in intensity of reflected light of the laser. From the difference of phase of the change in temperature at the sample surface and the heating beam, the thermal effusivity "b" of a small region is obtained. From the obtained thermal effusivity "b" and the following formula (1), the thermal conductivity "k" can be calculated. Here, in the following formula (1), "b" is the thermal effusivity [J/m²·s⁰·⁵·K], "k" is the thermal conductivity [W/(m·K)], ρ is the density [kg/m³], and C is the specific heat [J/(kg·K)].

$$b^2 = k \times \rho \times C \qquad \text{formula (1)}$$

Note that, in FIG. 1A etc., the cross-sectional shape of the inorganic filler 202 is expressed as a circular shape for convenience, but the shape of the inorganic filler 202 present in the resin layer 20 according to the present embodiment is not limited to a spherical shape and may be any shape. Further, as the inorganic filler 202 according to the present embodiment, the same inorganic fillers having different shapes or different types of inorganic fillers having different shapes may be combined for use. The shape of the inorganic filler 202 may utilize the shape which the substance utilized inherently has as it is or, for example, an inorganic filler may be deliberately worked using various types of mills to obtain the desired shape.

In the resin layer 20 according to the present embodiment, the content of the above such inorganic filler 202 is 10 to 45 vol % in range with respect to the total volume of the resin layer 20. If the content of the inorganic filler 202 is 10 vol % or more, the contact surfaces between the carbon reinforcing fiber 302 in the CFRP layer 30 and inorganic filler 202 can be sufficiently secured and an excellent thermal conductivity between the metal member 10 and the CFRP layer 30 can be secured through the resin layer 20. On the other hand, if the content of the inorganic filler 202 is 45 vol % or less, the adhesion between the metal member 10 and CFRP layer 30 (in other words, the adhesion of the resin layer 20) can be sufficiently secured, so when bent or otherwise deformed, peeling of the CFRP layer 30 and metal member 10 can be suppressed and a drop in the flexural strength can be suppressed, so this is preferable. In the present embodiment, the content of the inorganic filler 202 may, for example, be 12 vol % or more, 15 vol % or more, 18 vol % or more, or 20 vol % or more and further 40 vol % or less, 38 vol % or less, 35 vol % or less, or 33 vol % or less. Therefore, the content of the inorganic filler 202 is preferably 15 to 35 vol % in range, more preferably 20 to 33 vol % in range.

Here, the content of the inorganic filler 202 in the resin layer 20 becomes substantially the same value as the volume content of the inorganic filler with respect to the total solids in the treatment solution used for forming the resin layer 20, but if measuring the content of the inorganic filler 202 after the fact, it is sufficient to measure it in the following way. That is, in TG-DTA measurement, the resin layer 20 may be decomposed at a temperature where the amount of reduction of mass of the resin composition 201 becomes 100 mass % or a higher temperature (that is, the thermal decomposition temperature of the resin composition 201 or more) and the mass of the remaining inorganic filler 202 may be measured to thereby find the amount mixed in.

In the resin layer 20 according to the present embodiment, the average particle size (d50) of the inorganic filler 202 is preferably 1 to 100 μm in range. Here, the average particle size (d50) can be measured using a laser diffraction and scattering type particle size distribution measuring apparatus. For example, the inorganic filler 202 in question is ultrasonically treated together with water or another dispersion solvent to be made to disperse. The dispersed solution is set in the laser diffraction and scattering type particle size distribution measurement apparatus for measurement. At this time, it is possible to calculate the particle size distribution by inputting the refractive index of the inorganic filler 202 in question to the particle size distribution measurement apparatus. From the obtained particle size distribution, the median size (d50) can be calculated. In this Description, the "average particle size (d50)" indicates the median size (d50) based on the volume calculated from the particle size distribution.

By the average particle size of the inorganic filler 202 becoming 1 to 100 μm in range, contact between the inorganic filler 202 and the carbon reinforcing fiber 302 can be more reliably realized and the thermal conductivity as the metal-CFRP composite 1 according to the present embodiment as a whole can be further improved. Specifically, if the average particle size of the inorganic filler 202 is 1 μm or more, contact points between the particles of the inorganic filler 202 can be sufficiently secured and excellent heat transfer can be obtained. Further, if the average particle size of the inorganic filler 202 is 100 μm or less, such an inorganic filler 202 does not become that bulky, the viscosity of the treatment solution used when forming the resin layer 20 does not fall, uniform coating on the metal member 10 or the CFRP prepreg forming the CFRP layer 30 becomes possible, and excellent heat transfer can be obtained. In the metal-CFRP composite 1 according to the present embodiment, the average particle size of the inorganic filler 202 may be, for example, 2 μm or more, 3 μm or more, 5 μm or more, or 10 μm or more and, further, may be 90 μm or less, 80 μm or less, 70 μm or less, 60 μm or less, or 50 μm or less. Therefore, the average particle size of the inorganic filler 202 is more preferably 5 to 50 μm in range.

Here, the inorganic filler 202 according to the present embodiment may be one having a certain extent of distribution of particle size in the above range of average particle size.

Further, in the resin layer 20 according to the present embodiment, the same types or different types of inorganic fillers 202 having different average particle sizes may be combined for use. By combining for use inorganic filler 202 with different average particle sizes, it becomes possible to pack the inorganic filler 202 inside the resin layer 20 in a denser state and becomes possible to further improve the thermal conductivity of the metal-CFRP composite 1 according to the present embodiment as a whole.

Furthermore, in the resin layer 20 according to the present embodiment, it is possible to control the distribution of different particle size inorganic filler 202 in the thickness direction to make the average particle size of the inorganic filler 202 present at the metal member 10 side and the average particle size of the inorganic filler 202 present at the CFRP layer 30 different.

The resin layer 20 according to the present embodiment secures excellent heat transfer by partial contact of the inorganic filler 202 in the resin layer 20 and the carbon reinforcing fiber 302 in the CFRP layer 30. Therefore, there may preferably be a large amount of inorganic filler 202 present near the interface with the CFRP layer 30 in the resin layer 20. For example, if the average particle size of the inorganic filler 202 is made X μm, the number density of the inorganic filler 202 present in the region of the width X μm from the interface of the resin layer 20 and CFRP layer 30 in the direction toward the resin layer 20 is preferably 300/mm² or more. Note that, X μm, as explained above, is typically 1 to 100 μm in range. If such a number density is 300/mm² or more, the contact surfaces of the inorganic filler 202 in the resin layer 20 and the carbon reinforcing fiber 302 in the CFRP layer 30 can be sufficiently increased and excellent heat transfer can be obtained. For example, such a number density may be 320/mm² or more, 350/mm² or more, 370/mm² or more, or 400/mm² or more. Further, the upper limit of such a number density is not particularly limited, but may be 700/mm² or less, 650/mm² or less, or 600/mm² or less.

The number density of the inorganic filler 202 present in the region of the width X μm from the interface of the resin layer 20 and CFRP layer 30 in the direction toward the resin layer 20 can be measured in, for example, the following way. First, the CFRP composite 1 according to the present invention is buried in an ordinary temperature curing resin. The sample is cut at a location to be observed by a cutting machine to expose a cross-section so as to become parallel to the thickness direction. Next, the cross-section is observed by an optical microscope to determine the interface between the resin layer 20 and the CFRP layer 30. Such an interface is not necessarily straight. Next, based on the average particle size X μm of the inorganic filler 202 used, the region of a width X μm from the above interface in the direction toward the resin layer 20 is determined, the number of particles of the inorganic filler 202 in the region is counted, and the number density (/mm²) of the inorganic filler 202 is calculated. Note that, when only part of a particle of the inorganic filler 202 is present in the region, it is counted as present in that region.

As explained above, due to the presence of the resin layer 20 where an inorganic filler 202 having a 20 W/(m·K) or more thermal conductivity is contained in a content of 10 to 45 vol % with respect to the total volume of the resin layer 20 and having a number density of the inorganic filler 202 present in the region of a width equal to the average particle size of the inorganic filler 202 from the interface of the resin layer 20 and CFRP layer 30 in the direction toward the resin layer 20 of 300/mm² or more, direct contact of the metal member 10 and the carbon reinforcing fiber 302 in the CFRP layer 30 is prevented to achieve excellent insulation. Not only that, the carbon reinforcing fiber 302 in the CFRP layer 30 and the inorganic filler 202 in the resin layer 20 can be made to contact to secure excellent heat transfer.

Above, the resin layer 20 according to the present embodiment was explained in detail.

Regarding CFRP Layer 30

The CFRP layer 30 according to the present embodiment has a matrix resin 301 and a carbon reinforcing fiber 302 contained in such a matrix resin 301 formed into a composite. Alternatively, the CFRP layer 30 may have only a matrix resin 301 and a carbon reinforcing fiber 302 contained in such a matrix resin 301 and formed into a composite.

Regarding Matrix Resin 301

In the CFRP layer 30 according to the present embodiment, the matrix resin 301 may be a solidified form or cured form of the resin composition (or the cross-linkable resin composition). Here, when simply referring to a "solidified form", it means the resin component itself has solidified while when referring to a "cured form", it means various types of curing agents are included in the resin component to make it cure. Note that, the curing agent able to be contained in the cured form also includes the cross-linking agents such as explained later, while the above "cured form" includes a cross-linked and cured form obtained by cross-linking.

Resin Composition

As the resin composition forming the matrix resin 301, either of a thermosetting resin and thermoplastic resin can be used. Below, the case where the resin composition forming the matrix resin 301 has a thermoplastic resin as a main component and the case where it has a thermosetting resin as a main component will be explained in detail.

The case where the resin composition forming the matrix resin 301 has a thermoplastic resin (in particular, a heat resistant thermoplastic resin able to realize a predetermined heat resistance and strength) as a main component will first be explained.

The type of the thermoplastic resin able to be used for the matrix resin 301 is not particularly limited, but, for example, one or more resins selected from a phenoxy resin, polyolefin and its acid modified forms, polystyrene, polymethyl methacrylate, AS resin, ABS resin, polyethylene terephthalate and polybutylene terephthalate or other thermoplastic aromatic polyester, polycarbonate, polyimide, polyamide, polyamideimide, polyether imide, polyether sulfone, polyphenylene ether and its modified forms, polyphenylene sulfide, polyoxy methylene, polyarylate, polyether ketone, polyether ether ketone, polyether ketone ketone, polypropylene, nylon, etc. can be used. Note that, "thermoplastic resin" may also include a resin capable to be a cross-linked and cured form as the later explained second cured state. Further, the thermosetting resin able to be used for the matrix resin 301 is not particularly limited, but, for example, one or more resins selected from an epoxy resin, vinyl ester resin, phenol resin, and urethane resin can be used.

Here, if the matrix resin 301 contains a thermoplastic resin, it is possible to solve the problems in the case where a thermosetting resin is used for the matrix resin of the CFRP, that is, that the CFRP layer 30 has brittleness, that the tact time is long, that bending is not possible, and other problems. However, usually, a thermoplastic resin has a high viscosity when melted and is relatively hard to impregnate carbon reinforcing fiber 302 with in the state of a low viscosity such as with an epoxy resin before thermosetting or other thermosetting resin. Compared with a thermosetting resin, it is inferior in ability to impregnate the carbon reinforcing fiber 302. For this reason, it is difficult to raise the reinforcing fiber density in the CFRP layer 30 (VF: Volume Fraction) such as in the case of using a thermosetting resin as the matrix resin 301. For example, if using an epoxy resin as the matrix resin 301, it is easy to make the VF 60 vol % or so, but if using polypropylene or nylon or another thermoplastic resin as the matrix resin 301, sometimes it is difficult to make the VF more than 50 vol %. Further, if using polypropylene or nylon or another thermoplastic resin, it is not possible for the CFRP layer 30 to be given as high a heat resistance as when using an epoxy resin or other thermosetting resin.

To solve the problem when using such a thermoplastic resin, as the matrix resin 301, it is preferable to use a phenoxy resin. A phenoxy resin is very similar to an epoxy resin in molecular structure, so has the same extent of heat resistance as an epoxy resin. Further, the adhesion with the resin layer 20 becomes excellent. Furthermore, by adding an epoxy resin or other such curable component to a phenoxy resin and copolymerizing them, it is possible to obtain a so-called partially curable resin. By using such a partially curable resin as the matrix resin 301, it is possible to obtain a matrix resin excellent in impregnability into the carbon reinforcing fiber 302. Furthermore, by causing the curable component in the partially curable resin to thermally set, it is possible to keep the matrix resin 301 in the CFRP layer 30 from melting or softening when exposed to a high temperature like a usual thermoplastic resin and possible make the heat resistance of the phenoxy resin further rise. The amount of addition of the curable component in the phenoxy resin should be suitably determined considering the impregnability into the carbon reinforcing fiber 302 and the brittleness, tact time, and workability of the CFRP layer 30 etc. In this way, by using a phenoxy resin as the matrix resin 301, it is possible to add and control the curable component with a high degree of freedom.

Note that, for example, the surface of the carbon reinforcing fiber 302 is often coated with a sizing agent with a good compatibility with an epoxy resin. A phenoxy resin is very similar to an epoxy resin in structure, so by using a phenoxy resin as the matrix resin 301, it is possible to use a sizing agent for epoxy resin use as is. For this reason, it is possible to raise the cost competitiveness.

Further, among the thermoplastic resins, a phenoxy resin is provided with good shapeability and is excellent in adhesion with the carbon reinforcing fiber 302 or resin layer 20. In addition, by using an acid anhydride or isocyanate compound, caprolactam, etc. as a cross-linking agent, it is possible to give properties similar to a high heat resistance thermosetting resin after shaping. Accordingly, in the present embodiment, as the resin component of the matrix resin 301, it is preferable to use a solidified or cured form of a resin component containing 50 pts,mass or more of a phenoxy resin with respect to 100 pts,mass of the resin component. By using such a resin composition, it becomes possible to strongly bond the resin layer 20. The resin composition more preferably includes a phenoxy resin in 55 pts,mass or more with respect to 100 pts,mass of the resin component, for example, 60 pts,mass or more, 70 pts,mass or more, 80 pts,mass or more, 90 pts,mass or more, or 95 pts,mass or more. Alternatively, the resin composition may contain only a phenoxy resin. The form of the adhesive resin composition may, for example, be made a powder, varnish or other liquid, or film or other solid.

Note that, the content of the phenoxy resin, as explained below, can be measured using infrared spectroscopy (IR). If analyzing the ratio of content of the phenoxy resin from the resin composition covered by the infrared spectroscopy, it can be measured by using a general method of infrared spectroscopy such as the transmission method or ATR reflection method.

A sharp knife etc. is used to cut out the CFRP layer 30. As much as possible, the fibers and particles are removed by tweezers etc. to obtain a sample of the resin composition from the CFRP layer 30 for analysis. In the case of the transmission method, KBr powder and the powder of the resin composition for analysis are homogeneously mixed by a mortar etc. while crushing them to prepare a thin film for use as a sample. In the case of the ATR reflection method, in the same way as the transmission method, powders may be homogeneously mixed by a mortar while crushing them to prepare tablets to prepare samples or monocrystalline KBr tablets (for example diameter 2 mm×thickness 1.8 mm) may be scored at their surfaces by a file etc. and coated with powder of the resin composition for analysis for use as samples. Whichever the method, it is important to measure the background at the KBr by itself before mixing with the resin for analysis. The IR measurement apparatus used may be a general one on the commercial market, but as precision, an apparatus having a precision of analysis enabling differentiation of absorbance in 1% units and wavenumber in 1 $cm^{-1}$ units is preferable. For example, FT/IR-6300 made by JASCO Corporation etc. may be mentioned.

If investigating the content of the phenoxy resin, there are absorption peaks of the phenoxy resin at for example 1450 to 1480 $cm^{-1}$, near 1500 $cm^{-1}$, near 1600 $cm^{-1}$, etc. For this reason, the content of the phenoxy resin can be calculated based on a calibration line showing the relationship between the strengths of the absorption peaks and the content of phenoxy resin prepared in advance and strengths of the absorption peaks measured.

Here, a "phenoxy resin" is a linear polymer obtained by a condensation reaction of a dihydric phenol compound and epihalohydrin or a polyaddition reaction of a dihydric phenol compound and bifunctional epoxy resin and is a non-crystalline thermoplastic resin. A phenoxy resin can be obtained by a conventionally known method in a solution or without a solvent and can be used in the form of any of a powder, varnish, or film. The average molecular weight of the phenoxy resin is, in terms of the mass average molecular weight (Mw), for example, 10,000 or more and 200,000 or less in range, preferably 20,000 or more and 100,000 or less in range, more preferably 30,000 or more and 80,000 or less in range. By making the Mw of the phenoxy resin 10,000 or more in range, it is possible to increase the strength of a shaped article. This effect is further enhanced by making the Mw 20,000 or more, furthermore 30,000 or more. On the other hand, by making the Mw of the phenoxy resin 200,000 or less, it is possible to make the work efficiency and workability better. This effect is further enhanced by making the Mw 100,000 or less, furthermore 80,000 or less. Note that, the Mw in the Description is a value measured by gel permeation chromatography (GPC) and converted using a standard polystyrene calibration line.

The hydroxyl equivalent of the phenoxy resin (g/eq) used in the present embodiment is, for example, 50 or more and 1000 or less in range, but is preferably 50 or more and 750 or less in range, more preferably 50 or more and 500 or less in range. By making the hydroxyl equivalent of the phenoxy resin 50 or more, the hydroxyl groups decrease, whereby the water absorption falls, so the mechanical properties of the cured resin can be improved. On the other hand, by making the hydroxyl equivalent of the phenoxy resin 1,000 or less, the hydroxyl groups can be kept from being decreased, so the affinity with the material deposited on can be improved and the mechanical properties of the metal-CFRP composite 1 can be improved. This effect is further enhanced if making the hydroxyl equivalent 750 or less and furthermore 500 or less.

Further, the glass transition temperature (Tg) of the phenoxy resin, for example, is suitably 65° C. or more and 150° C. or less in range, but is preferably 70° C. or more and 150° C. or less in range. If the Tg is 65° C. or more, it is possible to secure the shapeability while keeping the fluidity of the resin from becoming too large, so a thickness Tc of the CFRP layer 30 can be sufficiently secured. On the other hand, if Tg is 150° C. or less, the melt viscosity becomes lower, so the reinforcing fiber base material can be easily impregnated without the formation of voids or other defects and the bonding process can be performed by a lower temperature. Note that, in the Description, the Tg of the resin is a value measured using a differential scanning calorimeter under conditions of a temperature rise of 10° C./min at a temperature of 20 to 280° C. in range and calculated by the peak value of a second scan.

The phenoxy resin is not particularly limited so long as satisfying the above physical properties, but as preferable ones, bisphenol A type phenoxy resin (for example, available as Phenotohto YP-50, Phenotohto YP-50S, and Phenotohto YP-55U made by Nippon Steel & Sumikin Chemical Co., Ltd.), bisphenol F type phenoxy resin (for example, available as Phenotohto FX-316 made by Nippon Steel & Sumikin Chemical Co., Ltd.), a copolymer type phenoxy resin of bisphenol A and bisphenol F (for example, available as YP-70 made by Nippon Steel & Sumikin Chemical Co., Ltd.) or resins other than the above mentioned phenoxy resins such as a brominated phenoxy resin or phosphorus-containing phenoxy resin, sulfonic group-containing phenoxy resin, or special phenoxy resin (for example, Phenotohto YPB-43C, Phenotohto FX293, YPS-007, etc. made by Nippon Steel & Sumikin Chemical Co., Ltd.), etc. may be mentioned. These resins may be used as single type alone or as two types or more mixed together.

The thermoplastic resin used as the resin component of the matrix resin 301 is preferably any one of a melt viscosity of 3,000 Pa·s or less, more preferably one of 90 Pa·s or more and 2,900 Pa·s or less in range of melt viscosity, still more preferably one of 100 Pas or more and 2,800 Pa·s or less in range of melt viscosity in any temperature region of 160 to 250° C. in range. By making the melt viscosity in 160 to 250° C. in range of temperature region 3,000 Pa·s or less, the fluidity at the time of melting becomes excellent and the CFRP layer 30 becomes resistant to the formation of voids and other defects. On the other hand, if the melt viscosity is 90 Pa·s or less, the molecular weight as a resin composition becomes too small. If the molecular weight is small, the resin becomes brittle and the metal-CFRP composite 1 ends up falling in mechanical strength.

Cross-Linkable Resin Composition

A resin composition containing the phenoxy resin (below, referred to as the "phenoxy resin (A)"), for example, may be mixed with an acid anhydride, isocyanate, caprolactam, etc. as a cross-linking agent to thereby obtain a cross-linkable resin composition (that is, cured form of the resin composition). The cross-linkable resin composition is made to cross-link by a reaction utilizing the secondary hydroxyl groups contained in the phenoxy resin (A), whereby the resin composition is improved in heat resistance, so this is advantageous for application to a member used in a higher temperature environment. For shaping by cross-linking utilizing the secondary hydroxyl groups of the phenoxy resin (A), a cross-linkable resin composition in which the cross-linkable curable resin (B) and the cross-linking agent (C) are mixed is preferable. As the cross-linkable curable resin (B), for example, an epoxy resin etc. can be used, but the invention is not particularly limited to this. By using such a cross-linkable resin composition, a cured form (cross-linked and cured form) in a second cured state with a Tg of the resin composition greatly improved over the phenoxy resin (A) alone is obtained. The Tg of the cross-linked and cured form of the cross-linkable resin composition is, for example, 160° C. or more, preferably 170° C. or more and 220° C. or less in range.

As the cross-linkable curable resin (B) mixed in the phenoxy resin (A) in the cross-linkable resin composition, a bifunctional or more epoxy resin is preferable. As the bifunctional or more epoxy resin, a bisphenol A type epoxy resin (for example, available as Epotohto YD-011, Epotohto YD-7011, and Epotohto YD-900 made by Nippon Steel & Sumikin Chemical Co., Ltd.), bisphenol F type epoxy resin (for example, available as Epotohto YDF-2001 made by Nippon Steel & Sumikin Chemical Co., Ltd.), diphenyl ether type epoxy resin(for example, available as YSLV-80DE made by Nippon Steel & Sumikin Chemical Co., Ltd.), tetramethyl bisphenol F type epoxy resin (for example, available as YSLV-80XY made by Nippon Steel & Sumikin Chemical Co., Ltd.), bisphenol sulfide type epoxy resin (for example, available as YSLV-120TE made by Nippon Steel & Sumikin Chemical Co., Ltd.), hydroquinone type epoxy resin (for example, available as Epotohto YDC-1312 made by Nippon Steel & Sumikin Chemical Co., Ltd.), phenol novolac type epoxy resin (for example, available as Epotohto YDPN-638 made by Nippon Steel & Sumikin Chemical Co., Ltd.), o-cresol novolac type epoxy resin (for example, Epotohto YDCN-701, Epotohto YDCN-702, Epotohto YDCN-703, and Epotohto YDCN-704 made by Nippon Steel & Sumikin Chemical Co., Ltd.), aralkyl naphthalene diol novolac type epoxy resin (for example, available as ESN-355 made by Nippon Steel & Sumikin Chemical Co., Ltd.), triphenyl methane type epoxy resin (for example, available as EPPN-502H made by Nippon Kayaku), etc. may be illustrated, but the invention is not limited to these. Further, these epoxy resins may be used as single type alone or used as two types or more mixed together.

Further, the cross-linkable curable resin (B) is not particularly limited in sense, but a crystalline epoxy resin is preferable. A crystalline epoxy resin having a melting point of 70° C. or more and 145° C. or less in range and a melt viscosity at 150° C. of 2.0 Pas or less is more preferable. By using a crystalline epoxy resin exhibiting such melting characteristics, it is possible to lower the melt viscosity of the cross-linkable resin composition used as the resin composition and possible to improve the adhesion of the CFRP layer 30. If the melt viscosity is over 2.0 Pa·s, the shapeability of the cross-linkable resin composition may fall and the homogeneity of the metal-CFRP composite 1 may fall.

As a crystalline epoxy resin suitable as a cross-linkable curable resin (B), for example, Epotohto YSLV-80XY, YSLV-70XY, YSLV-120TE, and YDC-1312 made by Nippon Steel & Sumikin Chemical Co., Ltd., YX-4000, YX-4000H, YX-8800, YL-6121H, YL-6640, etc. made by Mitsubishi Chemical Corporation, HP-4032, HP-4032D, HP-4700, etc. made by DIC Corporation, NC-3000 made by Nippon Kayaku, etc. may be mentioned.

The cross-linking agent (C) forms ester bonds with the secondary hydroxyl groups of the phenoxy resin (A) to thereby three-dimensionally cross-link the phenoxy resin (A). For this reason, unlike strong cross-linking such as curing of the thermosetting resin, it is possible to reverse the cross-linking by a hydrolysis reaction, so it becomes possible to easily peel apart the metal member 10 and bonding layer 20 and CFRP layer 20. Therefore, it becomes possible to recycle the metal member 10.

As the cross-linking agent (C), an acid anhydride is preferable. The acid anhydride is solid at ordinary temperature. If is not particularly limited so long as not having sublimation ability, but from the viewpoint of imparting heat resistance to the metal-CFRP composite 1 and reactivity, an aromatic acid anhydride having two or more acid anhydrides reacting with the hydroxyl groups of the phenoxy resin (A) is preferable. In particular, an aromatic compound having two acid anhydride groups such as pyromellitic anhydrides is suitably used since it becomes higher in cross-linking density and is improved in heat resistance compared with a combination of trimellitic anhydride and hydroxyl groups. Among aromatic acid dianhydrides, for example, 4,4'-oxydiphthalic acid and ethylene glycol bisanhydrotrimellitate, 4,4'-(4,4'-isopropylidene diphenoxy) diphthalic anhydride and other such aromatic acid dianhydrides having compatibility with a phenoxy resin and epoxy resin have large effects of improvement of the Tg and are more preferable. In particular, aromatic acid dianhydrides having two acid anhydride groups such as pyromellitic anhydride, for example, are improved in cross-linking density and improved in heat resistance compared with anhydrous phthalic acid having only one acid anhydride group, so are preferably used. That is, an aromatic acid dianhydride is good in reactivity since it has two acid anhydride groups and gives a cross-linked and cured form of sufficient strength for mold release in a short molding time and produces four carboxyl groups by an esterification reaction with the secondary hydroxyl groups in the phenoxy resin (A), so the final cross-linking density can be made higher.

The reaction of the phenoxy resin (A), the epoxy resin used as the cross-linkable curable resin (B), and the cross-linking agent (C) is cross-linked and cured an esterification reaction of the secondary hydroxyl groups in the phenoxy resin (A) and the acid anhydride groups of the cross-linking agent (C), furthermore, is cross-linked and cured by the reaction of the carboxyl groups produced by this esterification reaction and the epoxy groups of the epoxy resin. Due to the reaction of the phenoxy resin (A) and cross-linking agent (C), it is possible to obtain a cross-linked form of the phenoxy resin, but due to the copresence of the epoxy resin, the melt viscosity of the resin composition is made to fall, so impregnation in the material deposited on can be improved, cross-linked reaction is accelerated, the cross-linking density is improved, the mechanical strength is improved, and other excellent characteristics are exhibited.

Note that, in the cross-linkable resin composition, the epoxy resin used as the cross-linkable curable resin (B) is copresent, but the phenoxy resin (A) of the thermoplastic resin is the main component. It is believed that an esterification reaction between its secondary hydroxyl groups and the acid anhydride groups of the cross-linking agent (C) takes precedence. That is, the reaction between the acid anhydride used as the cross-linking agent (C) and the epoxy resin used as the cross-linkable curable resin (B) takes time (reaction speed is slow), so the reaction between the cross-linking agent (C) and the secondary hydroxyl groups of the phenoxy resin (A) takes preference. Next, the cross-linking density rises due to the reaction between the cross-linking agent (C) remaining due to the previous reaction or the residual carboxyl groups derived from the cross-linking agent (C) and the epoxy resin. For this reason, unlike a resin composition having the epoxy resin of the thermosetting resin as a main component, the cross-linked and cured form obtained by the cross-linkable resin composition is a thermoplastic resin and is excellent in storage stability.

In the cross-linkable resin composition utilizing cross-linking of the phenoxy resin (A), preferably the cross-linkable curable resin (B) is contained in 5 pts,mass or more and 85 pts,mass or less in range with respect to 100 pts,mass of the phenoxy resin (A). The content of the cross-linkable curable resin (B) with respect to 100 pts,mass of the phenoxy resin (A) is more preferably 9 pts,mass or more and 83 pts,mass or less in range, more preferably 10 pts,mass or more and 80 pts,mass or less in range. By making the content of the cross-linkable curable resin (B) 85 pts,mass or less, it is possible to shorten the curing time of the cross-linkable curable resin (B), so not only can the strength required for mold release be easily obtained in a short time, but also the recycling ability of the insulating FRP layer 20 is improved. This effect is further enhanced by making the content of the cross-linkable curable resin (B) 83 pts,mass or less, furthermore, 80 pts,mass or less. On the other hand, by making the content of the cross-linkable curable resin (B) 5 pts,mass or more, the effect of improvement of the cross-linking density by addition of the cross-linkable curable resin (B) becomes easier to obtain, the cross-linked and cured form of the cross-linkable resin composition can easily realize a Tg of 160° C. or more, and the fluidity becomes excellent. Note that, the content of the cross-linkable curable resin (B) can be measured in the same way for the peaks derived from the epoxy resin by the method using the above-mentioned infrared spectroscopy to measure the content of the cross-linkable curable resin (B).

The amount of the cross-linking agent (C) is usually an amount of 0.6 mole or more and 1.3 moles or less in range of acid anhydride groups with respect to 1 mole of secondary hydroxyl groups of the phenoxy resin (A), preferably an amount of 0.7 mole or more 1.3 moles or less in range, more preferably 1.1 moles or more and 1.3 moles or less in range. If the amount of acid anhydride groups is 0.6 mole or more, the cross-linking density becomes higher, so the mechanical properties and heat resistance become excellent. This effect is further enhanced by making the amount of acid anhydride groups 0.7 mole or more, furthermore 1.1 moles or more. If the amount of acid anhydride groups is 1.3 moles or less, the unreacted acid anhydrides or carboxyl groups can be kept from having a detrimental effect on the curing characteristics or cross-linking density. For this reason, it is preferable to adjust the amount of the cross-linkable curable resin (B) in accordance with the amount of cross-linking agent (C). Specifically, for example, due to the epoxy resin used as the cross-linkable curable resin (B), for causing a reaction of the carboxyl groups formed by action of the secondary hydroxyl groups of the phenoxy resin (A) and the acid anhydride groups of the cross-linking agent (C), the amount of the epoxy resin is preferably made an equivalent ratio with the cross-linking agent (C) of 0.5 mole or more and 1.2 moles or less in range. Preferably, the equivalent ratio of the cross-linking agent (C) and the epoxy resin is 0.7 mole or more and 1.0 mole or less in range.

If mixing in a cross-linking agent (C) together with the phenoxy resin (A) and cross-linkable curable resin (B), it is possible to obtain a cross-linkable resin composition, but it is also possible to further include an accelerator (D) as a catalyst so that the cross-linking reaction is reliably performed. The accelerator (D) is solid at ordinary temperature. It is not particularly limited so long as not having a sublimation ability, but, for example, triethylene diamine or other tertiary amine, 2-methyl imidazole, 2-phenyl imidazole, 2-phenyl-4-methyl imidazole, or other imidazoles, triphenyl phosphine or other organic phosphines, tetraphenyl sulfonium tetraphenyl borate or other tetraphenylborates, etc. may be mentioned. These accelerators (D) may be used as single type alone or as two types or more jointly used. Note that, if making the cross-linkable resin composition a fine powder and using the powder coating method using an electrostatic field so as to deposit it on the reinforcing fiber base material to form the matrix resin 301, as the accelerator (D), it is preferable to use an imidazole-based latent catalyst which is solid at an ordinary temperature of a catalyst activation temperature of 130° C. or more. If using an accelerator (D), the amount of the accelerator (D) is preferably 0.1 part by weight or more and 5 pts,mass or less in range with respect to 100 pts,mass of the total amounts of the phenoxy resin (A), cross-linkable curable resin (B), and cross-linking agent (C).

The cross-linkable resin composition is solid at ordinary temperature. Its melt viscosity is preferably, in terms of a lowest melt viscosity, comprised of a lower limit value of melt viscosity in a temperature region of 160 to 250° C. in range, of 3,000 Pa·s or less, more preferably 2,900 Pa·s or less, still more preferably 2,800 Pa·s or less. By making the lowest melt viscosity in a temperature region of 160 to 250° C. in range 3,000 Pa·s or less, at the time of thermocompression bonding by hot pressing etc., it is possible to make the cross-linkable resin composition sufficient impregnate the material to be deposited on and possible to suppress the formation of voids and other defects in the CFRP layer 20, so the metal-CFRP composite 1 is improved in mechanical properties. This effect is further enhanced by making the lowest melt viscosity at the temperature region of 160 to 250° C. in range 2,900 Pa·s or less, furthermore 2,800 Pa·s or less.

The resin composition for forming the matrix resin 301 (including cross-linkable resin composition) may contain, to an extent not detracting from the adhesion or physical properties, for example, natural rubber, synthetic rubber, an elastomer, etc. or various inorganic fillers, solvent, extender pigment, coloring agent, antioxidant, UV absorber, flame retardant, flame retardation aid, or other additives. In this case, such an additive is mixed in to give a total with the thermoplastic resin or other resin composition and carbon reinforcing fiber 302 of 100 vol %.

Next, the case where the resin composition forming the matrix resin 301 has a thermosetting resin as a main component will be explained.

In such a case, the resin composition forming the matrix resin 301 is comprised of a thermosetting resin, curing agent, and curing accelerator.

As the type of the above thermosetting resin, for example, at least one type of resin selected from the group comprised of an epoxy resin, vinyl ester resin, phenol resin, and urethane resin may be mentioned. Among the above thermosetting resins as well, from the two viewpoints of the heat resistance and strength, as the matrix resin 301, use of an epoxy resin is preferable.

The epoxy resin is a resin having one or more epoxy resins in each molecule and generally has a structure such as shown in the following (structural formula 1).

[Chemical 1]

(Structural formula 1)

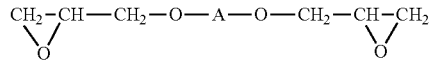

Regarding the above such epoxy resin, for example, as a difunctional epoxy resin, any of various known compounds can be used. For example, as a difunctional epoxy resin, an epoxy resin derived from ethylene glycol, trimethylene glycol, propylene glycol, 1,3-butanediol, 1,4-butanediol, 1, pentanediol, 1,4-pentanediol, 1,5-pentanediol, 1,6-hexanediol, or other chained aliphatic diol, an epoxy resin derived from cyclohexanediol, cyclodecanediol, bicyclohexanediol, decalindiol, cyclohexane dimethanol, bicyclohexane dimethanol, or other cyclic aliphatic diol, an epoxy resin derived from polyethylene ether glycol, polyoxytrimethylene ether glycol, polypropylene glycol, or other polyalkylene ether glycol, an aromatic group-containing epoxy resin derived from bisphenol A, bisphenol F, bisphenol S, bisphenol B, bisphenol C, bisphenol K, bisphenol AP, bisphenol BP, bisphenol E, bisphenol P, bisphenol PH, bisphenol AD, bisphenol AF, bisphenol fluorene, biscresol fluorene, bisphenol Z, bisphenol TMC, dimethyl bisphenol A, tetramethyl bisphenol A, dimethyl bisphenol F, tetramethyl bisphenol F, dimethyl bisphenol S, tetramethyl bisphenol S, tetramethyl bisphenol Z, hydroquinone, resorcine, catechol, methyl hydroquinone, dimethyl hydroquinone, trimethyl hydroquinone, butyl hydroquinone, dibutyl hydroquinone, methyl resorcine, biphenol, tetramethyl biphenol, dihydroxynaphthalene, dihydroxy methyl naphthalene, dihydroxy diphenyl ether, dihydroxy benzophenone, dihydroxy diphenyl sulfide, thiodiphenol, brominated bisphenol A, bisphenol obtained by a condensation reaction of a monofunctional phenol and a compound having one aldehyde group, bisphenol obtained by a condensation reaction of a monofunctional phenol and a compound having one carbonyl group, etc. may be mentioned. However, a difunctional epoxy resin used in the present embodiment is not limited to the above examples.

A preferable epoxy resin, from the viewpoint of the economy of acquisition, transparency, and low melt viscosity, is a difunctional epoxy resin derived from bisphenol A, bisphenol F, biphenol, or bisphenol Z.

As the type of the above curing agent, for example, a polyamine-based curing agent and its modified forms, an acid anhydride-based curing agent, an imidazole-based curing agent, etc. can be mentioned. As the polyamine-based curing agent, for example, diaminodiphenylmethane, m-phenylenediamine, and diaminodiphenylsulfone may be mentioned. As the acid anhydride-based curing agent, for example, tetrahydrophthalic anhydride, hexahydrophthalic anhydride, methyl tetrahydrophthalic anhydride, methyl hexahydrophthalic anhydride, methyl nadic anhydride, hydrogenated methyl nadic anhydride, trialkyl tetrahydrophthalic anhydride, methyl cyclohexene tetracarboxylic acid dianhydride, phthalic anhydride, anhydrous trimellitic acid, anhydrous pyromellitic acid, benzophenone tetracarbonic dianhydride, ethylene glycol bis(anhydrotrimellitate), glycerin bismonoacetate, dodecenyl succinic anhydride, aliphatic dibasic acid polyanhydride, and colanic acid anhydride may be mentioned. As the imidazole-based curing agent, for example, dicyan diamide, 2-methyl imidazole, 2-ethyl-4-methyl imidazole, 1-cyanoethyl-2-undecylimidazolium·trimellitate, epoxy-imidazole adduct, etc. may be mentioned. However, the curing agent able to be used in the present embodiment is not limited to the above example.

Further, as the type of the above curing accelerator, an imidazole-based curing accelerator, phosphorus-based curing accelerator, etc. may be mentioned.

Further, in the present embodiment, it is possible to use various solvents for adjusting the viscosity of the resin. As such a solvent, for example, hexane, heptane, octane, decane, dimethyl butane, pentene, cyclohexane, methyl cyclohexane, and other aliphatic hydrocarbons, acetone, methyl ethyl ketone, methyl isobutyl ketone, 2-heptanone, 4-heptanone, 2-octanone, cyclohexanone, cyclopentanone, and other ketone-based solvents, dioxane, ethyl phenyl ether, ethyl benzyl ether, ethylene glycol dimethyl ether, ethylene glycol diethyl ether, diethylene glycol dimethyl ether, and other ether-based solvents, methyl cellosolve, ethyl cellosolve, and other cellosolve-based solvents, methyl cellosolve acetate, ethyl cellosolve acetate, propylene glycol monomethyl ether acetate, and other alkylene glycol monoalkyl ether acetate-based solvents, dimethyl formamide, dimethyl sulfoxide, and other various solvents may be mentioned. Note that, the solvents able to be used for adjusting viscosity are not limited to the above examples. Further, several solvents may also be used.

Here, when adjusting the type of the thermosetting resin used or the amounts of mixture of the curing agent and curing accelerator, the viscosity in the temperature region of (Tg−80) to (Tg−50)° C. becomes 1 Pa·s or less where Tg [° C.] is the glass transition temperature of the thermosetting resin after curing. By adjusting the resin so that the time at such a viscosity becomes 30 minutes or more, the effect of the present invention is manifested more. Further, such a thermosetting resin cures by hot pressing in a (Tg−20) to (Tg+50)° C. temperature region and a desired flexural strength is given.

Regarding Carbon Reinforcing Fiber 302

In the CFRP layer 30 according to the present embodiment, as the carbon reinforcing fiber 302, at least one of pitch-based carbon reinforcing fiber having a thermal conductivity of 180 to 900 W/(m·K) in range or PAN-based carbon reinforcing fiber having a thermal conductivity of 100 to 200 W/(m·K) in range is used. By using carbon reinforcing fiber having the above such thermal conductivity alone or in combination, in the metal-CFRP composite 1 according to the present embodiment, it is possible to realize a better heat transfer. The thermal conductivity of the pitch-based carbon reinforcing fiber may be 200 W/(m·K) or more, 250 W/(m·K) or more, or 300 W/(m·K) or more and, further, may be 850 W/(m·K) or less, 800 W/(m·K) or less, or 750 W/(m·K) or less. The thermal conductivity of the PAN-based carbon reinforcing fiber may be 110 W/(m·K) or more, 120 W/(m·K) or more, or 130 W/(m·K) or more and, further, may be 190 W/(m·K) or less, 180 W/(m·K) or less, or 170 W/(m·K) or less.

Here, if the carbon reinforcing fiber 302 is pitch-based carbon reinforcing fiber having the above such thermal conductivity, the ratio of fiber of the pitch-based carbon reinforcing fiber is preferably 20 to 70 vol % with respect to the total volume of the CFRP layer 30. If the fiber content of the pitch-based carbon reinforcing fiber is 20 vol % or more, the contact points of the carbon reinforcing fibers can be sufficiently secured, heat is efficiently transferred, and sufficient heat transfer can be obtained. Further, if the content of the carbon reinforcing fiber is 20 vol % or more, it is possible to sufficiently secure the flexural strength and other mechanical properties. On the other hand, if the fiber content of the pitch-based carbon reinforcing fiber is 70 vol % or less, a certain amount of wet spread of the matrix resin 301 over the surface of the carbon reinforcing fiber 302 during shaping can be secured and it is possible to prevent voids from forming between the metal member 10 and CFRP layer 30. As a result, heat is efficiently transferred between the metal member 10 and the CFRP layer 30, so sufficient heat transfer can be obtained. Therefore, by making the fiber content of the pitch-based carbon reinforcing fiber 20 to 70 vol %, it becomes possible to more reliably realize excellent heat transfer. For example, the fiber content of the pitch-based carbon reinforcing fiber may be 25 vol % or more, 30 vol % or more, 35 vol % or more, or 40 vol % and may be 65 vol % or less, 60 vol % or less, or 55 vol % or less with respect to the total volume of the CFRP layer 30. Therefore, the fiber content of the pitch-based carbon reinforcing fiber is more preferably 30 to 60 vol % in range.

Further, if the carbon reinforcing fiber 302 is PAN-based carbon reinforcing fiber having the above such thermal conductivity, the fiber content of such PAN-based carbon reinforcing fiber is preferably 20 to 65 vol % with respect to the total volume of the CFRP layer 30. If the fiber content of the PAN-based carbon reinforcing fiber is 20 vol % or more, the contact points of the carbon reinforcing fibers can be sufficiently secured, heat is efficiently transferred, and sufficient heat transfer can be obtained. Further, if the content of the carbon reinforcing fiber is 20 vol % or more, it is possible to sufficiently secure the flexural strength and other mechanical properties. On the other hand, if the fiber content of the PAN-based carbon reinforcing fiber is 65 vol % or less, a certain amount of wet spread of the matrix resin 301 over the surface of the carbon reinforcing fiber 302 during shaping can be secured and it is possible to prevent voids from forming between the metal member 10 and CFRP layer 30. As a result, heat is efficiently transferred between the metal member 10 and the CFRP layer 30, so sufficient heat transfer can be obtained. Therefore, by making the fiber content of the PAN-based carbon reinforcing fiber 20 to 65 vol %, it becomes possible to more reliably realize excellent heat transfer. For example, the fiber content of the PAN-based carbon reinforcing fiber may be 25 vol % or more, 30 vol % or more, 35 vol % or more, or 40 vol % and may be 60 vol % or less, 55 vol % or less, or 50 vol % or less with respect to the total volume of the CFRP layer 30. Therefore, the fiber content of the PAN-based carbon reinforcing fiber is more preferably 30 to 60 vol % in range.

Note that, the fiber content of the carbon reinforcing fiber can be measured by the burning method prescribed in JIS K 7075: 1991. More specifically, first, the mass (Wa) of the test piece in question is measured. Further, the test piece is bound by nichrome wire and the mass of the test piece including the nichrome wire is measured (W1). After that, this is ignited by a bunsen burner and air is introduced to adjust the reducing flame to about 2 cm. Next, the nichrome wire part of the test piece is gripped by tweezers and the test piece is inserted horizontally into the flame so as not to contact the reducing flame and so that the entire test piece enters the flame of the part slightly above the reducing flame. The mass (W2) of the material after being burned up is measured and the following formula (1) is used to find the fiber mass content (Wf). Further, the following formula (2) can be used to find the fiber content (VF). Note that, in the following formula (2), pf is the density of the carbon reinforcing fiber 302 itself, while ρc is the density of the CFRP layer 30 itself. The density of the carbon reinforcing fiber 302 and the density of the CFRP layer 30 can respectively be found by the methods prescribed in JIS R 7601: 2006 and JIS K 7112:1999.

$$Wf = ((Wa - W1 + W2)/Wa) \times 100 \qquad \text{formula (1)}$$

$$VF = Wf \times \rho c / \rho f \qquad (2)$$

In the CFRP used in the CFRP layer 30, as the reinforcing fiber base material forming the base material of the carbon reinforcing fiber 302, for example, a nonwoven fabric base material using chopped fiber or a cloth material using continuous filaments, a unidirectional reinforcing fiber base material (UD material), etc. can be used. From the viewpoint of the reinforcing effect, as the reinforcing fiber base material, use of a cloth material or UD material is preferable.

Above, the CFRP layer 30 according to the present embodiment was explained in detail.

Regarding Volume Percents of Metal Member 10, Resin Layer 20, and CFRP Layer 30

In the metal-CFRP composite 1 according to the present embodiment, preferably the ratio of the metal member 10 in the total volume of the metal-CFRP composite 1 (volume percent) is 9 to 65 vol % in range, the ratio of the resin layer 20 (volume percent) is 1 to 25 vol % in range, the ratio of the CFRP layer 30 (volume percent) is 20 to 90 vol % in range, and the total of the ratios of the metal member 10, resin layer 20, and CFRP layer 30 is 100 vol %.

If the ratio of the metal member 10 is 9 vol % or more, the ratio of the metal member 10 is sufficiently secured, the CFRP layer 30 can be sufficiently reinforced, and the flexural strength of the metal-CFRP composite 1 can be made excellent. On the other hand, if the ratio of the metal member 10 is 65 vol % or less, the ratio of the metal member 10 does not become too high, the thermal conductivity of the metal-CFRP composite 1 in the thickness direction is not made to fall, and heat can be efficiently transferred to the surface of the metal member 10.

If the ratio of the resin layer 20 is 1 vol % or more, the resin layer 20 does not become too thin, contact between the metal member 10 and the carbon reinforcing fiber in the CFRP layer 30 is prevented, insulation between the metal member 10 and the CFRP layer 30 can be secured, and corrosion of the metal member 10 can be suppressed. On the other hand, if the ratio of the resin layer 20 is 25 vol % or less, the resin layer 20 does not become too thick and the transfer of heat to the surface of the metal member 10 can be kept from falling due to the low thermal conductivity of the resin layer 20.

If the ratio of the CFRP layer 30 is 20 vol % or more, the ratio of the heat transfer path of the CFRP layer 30 does not become too low and the thermal conductivity of the metal-CFRP composite 1 is secured well, so heat is efficiently transferred to the surface of the metal member 10. On the other hand, if the ratio of the CFRP layer 30 is 90 vol % or less, the ratio of the metal member 10 can be secured to an extent enabling reinforcement of the CFRP layer 30 and the flexural strength of the metal-CFRP composite 1 can be kept from falling.

The ratios of the metal member 10, resin layer 20, and CFRP layer 30 are more preferably respectively 15 to 50 vol %, 3 to 15 vol %, and 30 to 80 vol % in range.

Note that, the volume percents of the metal member 10, resin layer 20, and CFRP layer 30 (vol %) can be calculated from the thicknesses of the layers. That is, a cross-section of the sample can be polished, the thicknesses of the layers can be measured by a field emission scanning microscope JSM6500 made by JEOL or other known electron microscope, and the percents calculated from the thickness with the sample area.

Below, referring to FIG. 4, the method of measurement of the thicknesses of the metal member 10, resin layer 20, and CFRP layer 30 will be simply explained.

The thicknesses of the metal member 10, resin layer 20, and CFRP layer 30 can, for example, as explained below, be measured based on the cross-sectional method of the optical methods of JIS K 5600-1-7, Section 5.4. That is, without having a deleterious effect on the sample, the sample was buried using an ordinary temperature curing resin packed without gap and using Low Viscosity Epomount 27-777 made by Refine Tec Ltd. as the main agent and 27-772 as the curing agent. The sample was cut by a cutting machine to expose the cross-section so as to become parallel with the thickness direction at the location to be observed and was polished using abrasive paper of a count prescribed by JIS R 6252 or 6253 (for example, #280, #400, or #600) to prepare an observed surface. When using an abrasive, a suitable grade of diamond paste or similar paste is used for polishing to prepare an observed surface. Further, in accordance with need, buffing may be performed to smooth the surface of the sample to a state able to withstand observation.

A microscope provided with a lighting system suitable for giving optimum contrast to the image and enabling measurement with a precision of 1 μm (for example, BX51 made by Olympus etc.) was used to select fields of observation of a size of 300 μm. Note that, the size of a field may be changed to enable the respective thicknesses to be confirmed. For example, when measuring the thickness of the resin layer 20, a field of observation is divided into four equal parts such as shown in FIG. 3, the thickness of the resin layer 20 is measured at the center part in the width direction at each fraction, and the average thickness is made the thickness at the field of observation. The thickness of the resin layer 20 is made the distance from the surface of the fiber to the metal member 10. For the fields of observation of the thickness of the resin layer 20, five different locations are selected. Each field of observation is divided into four equal parts. The thicknesses of the fractions are measured and the average value is calculated. The adjoining fields of observation should be separated by 3 cm or more. The average values of the five locations may be further averaged and the value made the thickness of the resin layer 20. Further, the thicknesses of the metal member 10 and CFRP layer 30 as well may be measured in the same way as measurement of the thickness of the above resin layer 20.

The metal-CFRP composite 1 according to the present embodiment such as explained above is used for an electric vehicle etc. and is placed at the bottom surface part of a battery or a place where current flows the most and heat is generated to thereby inhibit uncontrolled operation of the battery. Further, the metal-CFRP composite 1 according to the present embodiment can be used for transferring heat stored in a tank containing warm water etc. to a specific location. In this case, the metal-CFRP composite 1 according to the present embodiment is used attached along the side surface of the tank etc. The metal-CFRP composite 1 according to the present embodiment is not limited to the above examples of use and can be used as a thermally conductive member.

Above, referring to FIG. 1A to FIG. 4, the metal-CFRP 1 composite according to the present embodiment will be explained in detail.

Regarding Method for Manufacturing Metal-CFRP Composite

Figure 5:
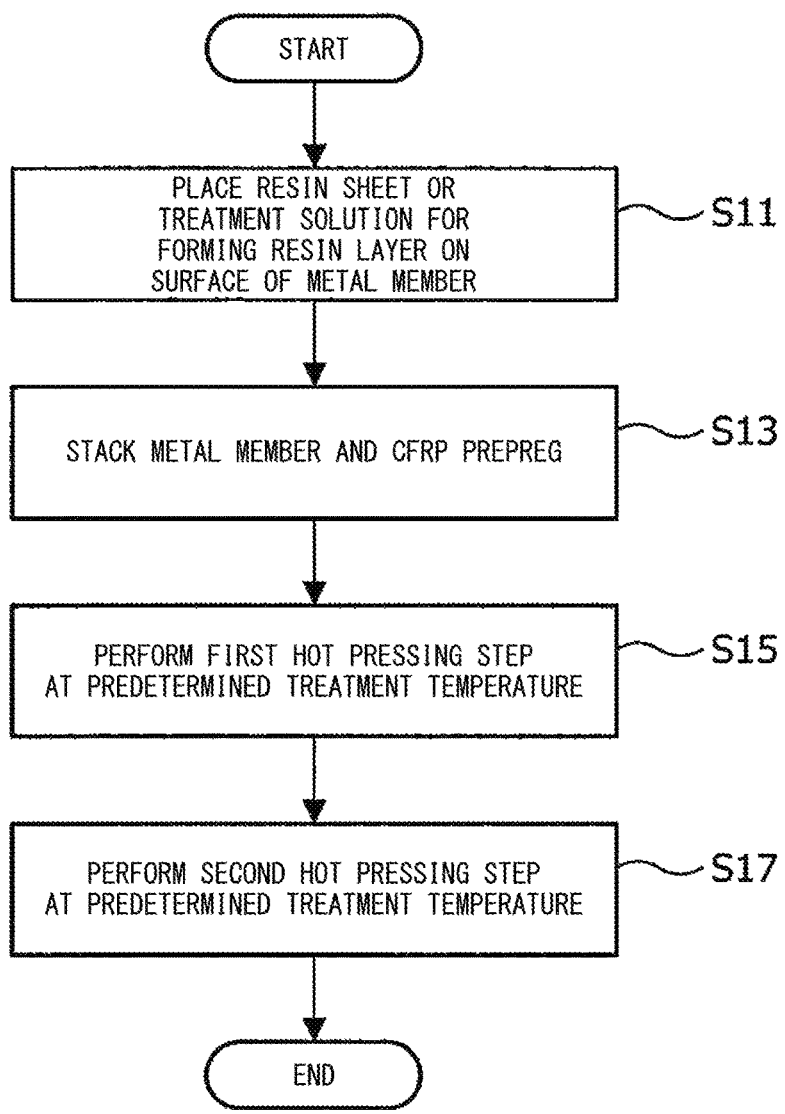
FIG. 5 is a flow chart showing one example of the flow of a method for manufacturing a composite of metal and carbon-fiber-reinforced plastic according to the same embodiment.

Next, while referring to FIG. 5, a method for manufacturing a metal-CFRP composite 1 according to the present embodiment will be simply explained. FIG. 5 is an explanatory view for explaining one example of a method for manufacturing a metal-CFRP composite 1 according to the present embodiment.

In the method for manufacturing a metal-CFRP composite 1 according to the present embodiment, as shown in FIG. 5, a treatment solution or resin sheet containing a predetermined resin material and an inorganic filler having a thermal conductivity of 20 W/(m·K) or more is placed on the surface of a predetermined metal member (step S11), then a CFRP prepreg containing a predetermined matrix resin and carbon reinforcing fiber present in such a matrix resin and having the above such predetermined thermal conductivity is placed on the metal member on which the treatment solution or resin sheet is placed to obtain a stacked assembly (step S13). After that, the obtained stacked assembly is subjected to a first hot pressing step at a treatment temperature in a predetermined temperature range determined in accordance with the type of the resin material contained in the above treatment solution (that is, crystalline resin or noncrystalline resin) applying 0.5 to 2.0 MPa of pressure for 30 to 60 minutes (step S15). After that, after the first hot pressing step, the stacked assembly is subjected to a second hot pressing step at a treatment temperature in a predetermined temperature range determined in accordance with the type of the resin material contained in the above treatment solution (that is, crystalline resin or noncrystalline resin) applying 0.5 to 2.0 MPa of pressure for 30 to 120 minutes (step S17).

Due to this, the treatment solution coated on the surface of the metal member 10 is dried and solidified resulting in the resin layer 20 according to the present embodiment. Further, the CFRP prepreg used for the stacked assembly becomes the CFRP layer 30 according to the present embodiment through the above such two-stage hot press-bonding process. Furthermore, due to the above such two-stage hot press bonding process, the metal member 10, resin layer 20, and CFRP layer 30 are formed into a composite thereby forming the metal-CFRP composite 1 according to the present embodiment.

Below, the method for manufacturing a metal-CFRP composite 1 according to the present embodiment will be explained in more detail.

Resin Placement Step

In the resin placement step according to the present embodiment (step S11), when preparing the treatment solution or resin sheet used, the content of the inorganic filler in the treatment solution or resin sheet is made 10 to 45 vol % in range with respect to the total volume of the resin sheet or treatment solution. If using a treatment solution, the viscosity of the treatment solution at 20 to 40° C. is made 1 to 30 Pa·s in range, preferably 3 to 25 Pa·s in range, more preferably 5 to 20 Pa·s in range. By making the viscosity of the resin material the above range, the obtained treatment solution can be uniformly coated on the metal member 10. As a result, it becomes possible to more reliably realize a resin layer 20 in which an inorganic filler is dispersed in a more preferable state. Note that, the viscosity of the treatment solution can be adjusted to the desired value by adding various types of additives such as explained to the treatment solution to lower the viscosity. Further, when preparing a treatment solution containing a resin material and inorganic filler, for example, it is preferable to stir the treatment solution under suitable conditions such as 2000 rpm for 1 minute. Here, when preparing the treatment solution used at step S11, as the inorganic filler, it is preferable to use inorganic filler having an average particle size of 1 to 100 μm in range.

Note that, at step S11, the amount of deposition of the treatment solution on the surface of the metal member 10 is preferably made 25 to 630 g/m² in range, more preferably 50 to 500 g/m² in range, still more preferably 100 to 400 g/m² in range. By making the amount of deposition of the treatment solution the above range, the thickness of the resin layer 20 can be made 20 to 300 μm in range. Further, at step S11, when using a resin sheet rather than a treatment solution as well, it is preferable to use a resin sheet having a thickness corresponding to an amount of deposition of the treatment solution of 25 to 630 g/m².

Stacking Step

In the stacking step (step S13) according to the present embodiment, what is stacked with the metal member 10 coated with the above treatment solution is not cured CFRP, but a CFRP prepreg. By using not cured CFRP, but a pre-cured CFRP prepreg, in the later two-stage hot pressing process, it is possible to create a state where the carbon reinforcing fiber in the CFRP prepreg and the inorganic filler contained in the treatment solution can easily contact each other and excellent thermal conductivity can be realized in the metal-CFRP composite 1 obtained after the hot pressing step.

Note that, a preferable method for manufacturing a CFRP prepreg used in the stacking step according to the present embodiment will be explained again below.

First Hot Pressing Step

In the first hot pressing step (step S15) according to the present embodiment, the treatment temperature, as explained above, differs according to whether the resin material in the treatment solution is a thermosetting resin or a thermoplastic resin and further whether it is a noncrystalline resin or crystalline resin. For example, when the resin material in the treatment solution is a noncrystalline thermosetting resin, the treatment temperature is made (Tg−80) to (Tg−50)° C. in range, where Tg [° C.] is the glass transition temperature of the noncrystalline thermosetting resin after curing. On the other hand, for example, when the resin material in the treatment solution is a crystalline thermosetting resin, the treatment temperature is made (Tm) to (Tm+20)° C. in range, where Tm [° C.] is the melting point of the crystalline thermosetting resin.

Below, the case where the resin material in the treatment solution is a noncrystalline thermosetting resin will be given as an example to specifically explain the invention.

When using a noncrystalline thermosetting resin as the resin material, such a thermosetting resin includes main agents of a resin material and curing agent and a curing accelerator. When using a solid curing agent as a curing agent, before the curing starts, the curing agent liquefies and falls in viscosity. By applying pressure once in the state of the lowered viscosity before the start of curing, it is possible to create a state where the inorganic filler in the treatment solution and the carbon reinforcing fiber in the CFRP prepreg forming the CFRP layer 30 easily contact each other. As a result, it becomes possible to manufacture a metal-CFRP composite excellent in thermal conductivity.

The above such state where the viscosity before curing starts falls corresponds to (Tg−80) to (Tg−50)° C. in range where Tg [° C.] is the glass transition temperature of the noncrystalline thermosetting region after curing. Therefore, by performing the first hot pressing step at a treatment temperature falling in such a temperature region, excellent contact between the inorganic filler and carbon reinforcing fiber can be realized. The treatment temperature in the case of using a noncrystalline thermosetting resin is preferably (Tg−70) to (Tg−60)° C. in range.

Further, it is separately confirmed that the above such state where the viscosity drops before curing is started is observed even when using a liquid-based curing agent. Even if using a liquid-based curing agent, by performing the first hot pressing step at a treatment temperature falling in the above temperature region, it becomes possible to realize excellent contact between the inorganic filler and carbon reinforcing fiber.

Further, when using a crystalline thermosetting resin, the above such state where the viscosity drops before curing corresponds to (Tm) to (Tm+20)° C. in range where Tm [° C.] is the melting point of the crystalline thermosetting resin. Therefore, by performing the first hot pressing step at a treatment temperature falling in such a temperature region, it becomes possible to realize excellent contact between the inorganic filler and carbon reinforcing fiber. The treatment temperature when using a crystalline thermosetting resin is preferably (Tm+5) to (Tm+15)° C. in range.

If the thermocompression bonding temperature is over the above upper limit value, the thermosetting resin is liable to end up starting to cure, so this is not preferable. On the other hand, if the thermocompression bonding temperature is less than the above lower limit value, the curing agent is liable to not sufficiently fall in viscosity and the inorganic filler and carbon reinforcing fiber are liable to be unable to sufficiently contact each other.

The pressure applied in the first hot pressing step is made 0.5 to 2.0 MPa in range. If the pressure is 0.5 MPa or more, it is possible to realize excellent contact of the inorganic filler and carbon reinforcing fiber and possible to give the metal-CFRP composite 1 manufactured an excellent heat transfer. Further, when the pressure is 2.0 MPa or less, the carbon reinforcing fiber can be fully prevented from contacting the metal member and electrolytic corrosion can be prevented from occurring between the metal member and CFRP layer of the metal-CFRP composite 1 manufactured. Further, if 2.0 MPa or less, it is possible to prevent breakage of the carbon reinforcing fiber whereby the desired strength is realized. The pressure applied in the first hot pressing step may, for example, be 0.7 MPa or more or 1.0 MPa or more and, further, may be 1.8 MPa or less or 1.5 MPa or less. Therefore, preferably, the pressure applied in the first hot pressing step is 1.0 to 1.5 MPa.

Further, the holding time of the first hot pressing step is made 30 to 60 minutes in range. If the holding time is 30 minutes or more, it is possible to realize excellent contact of the inorganic filler and carbon reinforcing fiber and possible to give the metal-CFRP composite 1 manufactured an excellent heat transfer ability. On the other hand, if the holding time is 60 minutes or less, the carbon reinforcing fiber can be fully prevented from contacting the metal member and electrolytic corrosion can be prevented from occurring between the metal member and CFRP layer of the metal-CFRP composite 1 manufactured. The holding time in the first hot pressing step may, for example, be 35 minutes or more or 40 minutes or more and further may be 55 minutes or less or 50 minutes or less. Therefore, preferably, the holding time in the first hot pressing step is 40 to 50 minutes.

Second Hot Pressing Step

The second hot pressing step (step S17) according to the present embodiment is a step of hot pressing a stacked assembly in which excellent contact between the inorganic filler and carbon reinforcing fiber is realized to thereby form a composite of the metal member and CFRP. In such a second hot pressing step, the treatment temperature, in the above way, differs according to whether the resin material in the treatment solution is a noncrystalline thermosetting resin or is a crystalline thermosetting resin. More specifically, if the resin material in the treatment solution is a noncrystalline thermosetting resin, the treatment temperature is made (Tg−20) to (Tg+50)° C. in range, preferably is made (Tg−10) to (Tg+40)° C. in range, where Tg [° C.] is the glass transition temperature of the noncrystalline thermosetting resin after curing. On the other hand, if the resin material in the treatment solution is a crystalline thermosetting resin, the treatment temperature is made (Tm+25) to (Tm+50)° C. in range, preferably is made (Tm+30) to (Tm+45)° C. in range, where Tm [° C.] is the melting point of the crystalline thermosetting resin is made.

If the treatment temperature is the above upper limit value or less, excess heat does not act on the resin and the resin can be kept from decomposing. Further, if the treatment temperature is the above lower limit value or more, the resin can be made to sufficiently proceed in curing and the manufactured metal-CFRP composite 1 can be given sufficient flexural strength.

Further, the pressure at the time of thermocompression bonding is made 0.5 to 2.0 MPa in range. If the pressure is 0.5 MPa or more, voids can be kept from forming at the interface of the metal member and resin layer and the manufactured metal-CFRP composite 1 can be given excellent heat transfer ability or flexural strength. Further, if the pressure is 2.0 MPa or less, the carbon reinforcing fiber can be sufficiently prevented from contacting the metal member and electrolytic corrosion can be prevented from occurring between the metal member and CFRP layer of the manufactured metal-CFRP composite 1. Further, if 2.0 MPa or less, breakage of the carbon reinforcing fiber can be prevented and the desired strength is realized. The pressure applied at the second hot pressing step may, for example, be 0.7 MPa or more or 1.0 MPa or more. Further, it may be 1.8 MPa or less or 1.5 MPa or less. Therefore, preferably, the pressure applied at the second hot pressing step is 1.0 to 1.5 MPa.

The holding time in the second hot pressing step is made 30 to 120 minutes in range. If the holding time is 30 minutes or more, curing the resin can be made to sufficiently proceed and the desired flexural strength can be achieved. Further, if the holding time is 120 minutes or less, embrittlement of the resin in the CFRP can be suppressed and excellent flexural strength can be obtained. The holding time at the second hot pressing step, for example, may be 40 minutes or more or 50 minutes or more. Further, it may be 100 minutes or less or 80 minutes or less. Therefore, preferably, the holding time at the first hot pressing step is 40 to 100 minutes.

The above explained such first hot pressing step and second hot pressing step are realized by placing the stacked assembly on a press forming machine and press forming it. Further, the above such bulk forming is preferably performed by a hot press, but it is also possible to quickly set a material preheated up to a predetermined temperature in a low temperature press forming machine to form it.

Further, above, the case of using a noncrystalline thermosetting resin was explained in detail, but if using a thermoplastic resin, as explained below, it becomes possible to manufacture a metal-CFRP composite according to the present embodiment.

For example, if using a noncrystalline thermoplastic resin, it becomes possible to manufacture a metal-CFRP composite according to the present embodiment by going through the following steps.

That is, a resin sheet containing a predetermined resin material and an inorganic filler having a conductivity of 20 W/(m·K) or more or a treatment solution having a viscosity at 20 to 40° C. of 1 to 30 Pa·S is placed at the surface of a predetermined metal member. After that, the carbon fiber reinforced plastic prepreg containing a predetermined matrix resin and carbon reinforcing fiber present in the matrix resin and having the above such predetermined thermal conductivity is arranged on the metal member after placement of the resin sheet or treatment solution to obtain a stacked assembly. Next, the stacked assembly is subjected to a first hot pressing step in a predetermined range of treatment temperature applying 0.5 to 2.0 MPa pressure for 30 to 60 minutes, then, after the first hot pressing step, the stacked assembly is subjected to a second hot pressing step at a predetermined range of treatment temperature applying 0.5 to 2.0 MPa of pressure for 30 to 120 minutes.

Here, the content of the inorganic filler in the resin sheet or treatment solution is made 10 to 45 vol % in range with respect to the total volume of the resin sheet or treatment solution.

Further, in the case where the resin material in the resin sheet or the treatment solution is a noncrystalline thermoplastic resin, the treatment temperature of the first hot pressing step is made a temperature lower than the decomposition temperature and (Tg+100) to (Tg+200)° C., preferably (Tg+120) to (Tg+180)° C., in temperature range, where Tg [° C.] is the glass transition temperature of the resin material.

Furthermore, in the case where the resin material in the resin sheet or the treatment solution is a noncrystalline thermoplastic resin, the treatment temperature of the second hot pressing step is made Tg to (Tg+150)° C., preferably (Tg+30) to (Tg+120)° C. in range.

Further, if using a crystalline thermoplastic resin, it becomes possible to manufacture the metal-CFRP composite according to the present embodiment through the following such steps.

That is, a resin sheet containing a predetermined resin material and an inorganic filler having a conductivity 20 W/(m·K) or more or a treatment solution having a viscosity at 20 to 40° C. of 1 to 30 Pa·S is placed at the surface of the predetermined metal member. After that, the carbon fiber reinforced plastic prepreg containing a predetermined matrix resin and carbon reinforcing fiber present in the matrix resin and having the above such predetermined thermal conductivity is arranged on the metal member after placement of the resin sheet or treatment solution to obtain a stacked assembly. Next, the stacked assembly is subjected to a first hot pressing step in a predetermined range of treatment temperature applying 0.5 to 2.0 MPa pressure for 30 to 60 minutes, then, the stacked assembly after the first hot pressing step is subjected to a second hot pressing step in a predetermined in range of treatment temperature applying 0.5 to 2.0 MPa of pressure for 30 to 120 minutes. If using a thermoplastic resin as well, the pressure and time in the first hot pressing step and second hot pressing step can be suitably changed as explained in the case of using the thermosetting resin.

Here, the content of the inorganic filler in the resin sheet or treatment solution is made 10 to 45 vol % in range with respect to the total volume of the resin sheet or treatment solution.

Further, when the resin material in the resin sheet or the treatment solution is a crystalline thermoplastic resin, the treatment temperature of the first hot pressing step is made a temperature lower than the decomposition temperature and (Tm) to (Tm+50)° C., preferably (Tm+10) to (Tm+40)° C. in temperature range, where Tm [° C.] is the melting point of the crystalline thermoplastic resin.

Furthermore, when the resin material in the treatment solution is a crystalline thermoplastic resin, the treatment temperature of the second hot pressing step is made a temperature lower than the decomposition temperature and (Tm) to (Tm+20)° C., preferably (Tm+5) to (Tm+15)° C. in range, where Tm [° C.] is the melting point of the crystalline thermoplastic resin.

Regarding Additional Heating Step

In the method for manufacturing such as explained above, if using as the raw material resin for forming the matrix resin, a cross-linkable adhesive resin composition comprised of the phenoxy resin (A) containing the cross-linkable curable resin (B) and cross-linking agent (C), further an additional heating step may be included.

If using a cross-linkable adhesive resin composition, in the above thermocompression bonding step, due to the cured form in the first cured state (solidified form) which is solidified, but not cross-linked (cured), it is possible to form a CFRP layer 30 containing a matrix resin comprised of a cured form in the first cured state (solidified form).

In this way, through the above thermocompression bonding step, it is possible to obtain a preform of a metal-CFRP composite 1 comprised of the metal member 10, resin layer 20, and CFRP layer 30 comprised of the cured form (solidified form) in the first cured state stacked together and integrally joined. Further, this preform may be further subjected to an additional heating step after the thermocompression bonding step to thereby at least post-cure the CFRP layer 30 comprised of the cured form (solidified form) in the first cured state and make the resin cross-link and cure to make it change to a cured form in the second cured state (cross-linked and cured form).

The additional heating step for post curing is, for example, preferably performed at 200° C. or more and 250° C. or less in range of temperature for 30 minutes to 60 minutes or so in time. Note that, instead of post curing, it is also possible to utilize the heat history in coating and other later steps.

As explained above, if using a cross-linkable adhesive resin composition, the Tg after cross-linking and curing is improved more than the phenoxy resin (A) alone. For this reason, the Tg changes before and after subjecting the above-mentioned preform to the additional heating step, that is, in the process of the resin changing from the cured form in the first cured state (solidified form) to the cured form in the second cured state (cross-linked and cured form). Specifically, the Tg before cross-linking at the preform is, for example, 150° C. or less, while the Tg of the resin cross-linked after the additional heating step is, for example, 160° C. or more, preferably 170° C. or more and 220° C. or less in range, so the heat resistance can be greatly raised.

Regarding Pretreatment Steps

When manufacturing the metal-CFRP composite 1, as a pretreatment step, the metal member 10 is preferably degreased. Treating the mold for release and removing deposits on the surface of the metal member 10 (removing foreign matter) are more preferable. Except for steel sheet extremely high in adhesion such as TFS (tin free steel), usually a steel sheet or other metal member 10 on which rust-preventing oil etc. is deposited is preferably degreased to restore the adhesion. The necessity for degreasing can be judged by joining the metal member in question with the CFRP in question in advance without a degreasing step and checking if sufficient adhesion is obtained.

Regarding Post Treatment Steps

In the post treatment steps for the metal-CFRP composite 1, in addition to coating, the composite is drilled for bolting or riveting or other mechanical joining with other members, is coated with an adhesive for bonding, etc.

Regarding Method for Manufacturing CFRP Prepreg

Here, a method for manufacturing a CFRP prepreg used when forming an CFRP layer 30 will be explained.

In the CFRP prepreg used when forming the CFRP layer 30, for the carbon reinforcing fiber base material forming the carbon reinforcing fiber, for example, a nonwoven fabric base material using chopped fiber or a cloth material using continuous filaments, a unidirectional reinforcing fiber base material (UD material), etc. can be used, but from the viewpoint of the reinforcing effect, use of a cloth material or UD material is preferable.

Here, if using a thermosetting resin, the CFRP prepreg can be manufactured by lightly coating resin on release paper to obtain coated paper, laying a large number of carbon fibers on it, and pressing them apart by a press roller to impregnate them with the resin.

Further, if using a thermoplastic resin, for the CFRP prepreg, rather than a prepreg fabricated by the wet melt or film stack method or other conventional known method, a prepreg prepared using powder coating method is preferably used. A prepreg prepared by the powder coating method is excellent in drapeability since the resin is impregnated in the reinforcing fiber base material in the state of fine powder. Even of the material deposited on is complicated in shape, it can be covered, so this is suitable for hot pressing for bulk molding.

As the main methods of the powder coating, for example, there are the electrostatic coating method, fluid bed method, suspension method, etc. Any of the method may be suitably selected depending on the type of the reinforcing fiber base material or the type of the matrix resin. Among these, the electrostatic coating method and fluid bed method are methods suitable for a thermoplastic resin. These are preferable since the processes are simple and the productivity is excellent. In particular, the electrostatic coating method is the most preferable method due to the excellent uniformity of deposition of the adhesive resin composition on the reinforcing fiber base material.

When forming the CFRP prepreg, if powder coating the adhesive resin composition forming the matrix resin, preferably the adhesive resin composition containing the above-mentioned thermoplastic resin is rendered a fine powder and this fine powder is deposited on the reinforcing fiber base material by powder coating to obtain the prepreg.

Note that, to form an adhesive resin composition containing a phenoxy resin (A), one example of a thermoplastic resin, into a fine powder, for example, a low temperature dry crusher (centrifugal dry mill) or other crusher may be used, but the invention is not limited to this. Further, when crushing the adhesive resin composition for matrix resin use, the components of the adhesive resin composition may be crushed, then mixed or the components may be mixed in advance, then crushed. In this case, the crushing conditions are preferably set so that each fine powder becomes the later explained average particle size. The thus obtained fine powder has an average particle size of 10 µm or more and 100 µm or less in range, preferably 40 µm or more and 80 µm or less in range, more preferably 40 µm or more and 50 µm or less in range. By the average particle size being made 100 µm or less, in powder coating in an electrostatic field, the energy when the adhesive resin composition strikes the fiber can be reduced and rate of deposition on the reinforcing fiber base material can be raised. Further, by making the average particle size 10 µm or more, it is possible to prevent particles from being scattered by the associated air flow to thereby keep the efficiency of deposition from falling and possible to prevent fine particles of resin floating in the air from causing degradation of the work environment.

When coating a powder of a cross-linkable adhesive resin composition comprised of a phenoxy resin (A), one example of a thermoplastic resin, to which a cross-link curable resin (B) and cross-linking agent (C) are mixed as the adhesive resin composition for forming the CFRP prepreg, the average particle sizes of the fine powder of the phenoxy resin (A) and the fine powder of the cross-linkable curable resin (B) are preferably 1 to 1.5 times the average particle size of the fine powder of the cross-linking agent (C) in range. By making the particle size of the fine powder of the cross-linking agent (C) equal to the particle size of the phenoxy resin (A) and cross-linkable curable resin (B) or less, the cross-linking agent (C) penetrates to the inside of the reinforcing fiber base material and deposits on the reinforcing fiber material. Further, the cross-linking agent (C) becomes evenly present around the particles of the phenoxy resin (A) and the particles of the cross-linkable curable resin (B), so makes the cross-linking reaction reliably proceed.

In the powder coating for forming the CFRP prepreg, it is preferable to coat the powder so that the amount of deposition of the adhesive resin composition forming the matrix resin on the reinforcing fiber base material (resin ratio: RC) becomes, for example, 20% or more and 50% or less in range. The RC more preferably becomes 25% or more and 45% or less in range, still more preferably 25% or more and 40% or less in range. By making RC 50% or less, it is possible to prevent a drop in the tensile and bend elastic modulus and other mechanical properties of the FRP. Further, by making RC 20% or more, the required amount of deposition of resin can be secured, so the matrix resin becomes sufficiently impregnated inside the reinforcing fiber base material and the thermophysical properties and the mechanical properties can be improved.

The fine powder of the powder coated adhesive resin composition (forming matrix resin) may be fixed to the reinforcing fiber base material by being heated to melt. In this case, the powder may be heated to melt after coating the powder on the reinforcing fiber base material or the powder may be coated on a preheated reinforcing fiber base material to thereby simultaneously coat the fine powder of the adhesive resin composition on the reinforcing fiber base material and make it melt. By heating the fine powder of the adhesive resin composition on the surface of the reinforcing fiber base material to melt in this way, the adhesion to the reinforcing fiber base material can be raised and the fine powder of the coated adhesive resin composition can be prevented from shedding. However, at this stage, the adhesive resin composition forming the matrix resin concentrates at the surface of the reinforcing fiber base material and does not reach the inside of the reinforcing fiber base material like with a hot pressed article. Note that, the heating time for making the adhesive resin composition melt after coating the powder is not particularly limited, but is normally 1 to 2 minutes. The melting temperature is 150 to 240° C. in range, preferably 160 to 220° C. in range, more preferably 180 to 200° C. in range. If the melting temperature is over the upper limit, there is a possibility that the curing reaction will end up proceeding. Further, if below the lower limit, the heat fusion becomes insufficient and, at the time of handling work, fine powder of the adhesive resin composition is liable to shed and drop off etc.

Above, the method for manufacturing a metal-CFRP composite 1 according to the present embodiment was explained in detail.

EXAMPLES

Below, examples and comparative examples will be shown while specifically explaining the metal-CFRP composite according to the present invention.

Below, examples will be used to more specifically explain the present invention, but the present invention is not limited to these examples. Note that, the tests and measurement methods for the various physical properties in the examples were as follows:

Metal Member

As the metal member, the following four types of metal members were used. Note that, the following metal members were all used after being fully decreased by acetone. The thicknesses of the three types of steel sheets were all 0.18 mm, while the Al alloy sheet was 0.50 mm.

Tin-free steel (TFS) sheet made by Nippon Steel & Sumitomo Metal Corporation

Hot dip galvannealed steel sheet (GA) made by Nippon Steel & Sumitomo Metal Corporation Electrogalvanized steel sheet (EG) made by Nippon Steel & Sumitomo Metal Corporation Al alloy sheet (A6061) made by Okouchi Metal Corporation Febrication of Epoxy Resin CFRP Prepreg An epoxy resin composition was prepared using an epoxy resin (YD128 made by Nippon Steel & Sumikin Chemical Co., Ltd., Mw=380) as the thermosetting resin forming the matrix resin, using dicyan diamide as the curing agent (made by Air Products Ltd.), and using an imidazole-based curing accelerator (made by Ajinomoto Fine Tech, Amicure) as the curing accelerator. This composition was determined while measuring the temperature and viscosity by a HAAKE RheoStress RS600 made by Thermo Electron Corporation. The glass transition point of the epoxy resin composition after curing was Tg=135° C. Such an epoxy resin composition was made to impregnate the reinforcing fiber base material comprised of the pitch-based carbon reinforcing fiber (UD material: made by Nippon Graphite Fiber Co., Ltd.; thermal conductivity=500 W/(m·K)) or the reinforcing fiber base material comprised of the PAN-based carbon reinforcing fiber (UD material: made by Toray; thermal conductivity=152 W/(m·K)) to prepare an epoxy resin CFRP prepreg of the thickness and fiber content VF shown in the following Table 1-1 and Table 1-2.

Preparation of Phenoxy Resin CFRP Prepreg

As the thermoplastic resin forming the matrix resin, a phenoxy resin (YP-50S made by Nippon Steel Chemical & Material Co., Ltd., Tg=85° C.) was used to form a thickness 100 μm film by a hot press. The film of the phenoxy resin was superposed on a reinforcing fiber base material comprised of pitch-based carbon reinforcing fiber (UD material: made by Nippon Graphite Fiber Co., Ltd.) and made to impregnate the fiber base material by the hot press to prepare a phenoxy resin CFRP prepreg of the thickness and fiber content VF shown in the following Table 1-1.

Preparation of Polypropylene Resin CFRP Prepreg

As the thermoplastic resin forming the matrix resin, a polypropylene resin (QE060, B, made by Mitsui Chemicals Inc., Tm=140° C.) was used to form a thickness 100 μm film by a hot press. The film of the polypropylene resin was superposed on a reinforcing fiber base material comprised of pitch-based carbon reinforcing fiber (UD material: made by Nippon Graphite Fiber Co., Ltd.) and made to impregnate the fiber base material by the hot press to prepare a polypropylene resin CFRP prepreg of the thickness and fiber content VF shown in the following Table 1-1.

Preparation and Coating of Treatment Solution for Forming Resin Layer

As the resin material, an epoxy resin similar to the above epoxy resin CFRP prepreg or a phenoxy resin similar to the above phenoxy resin CFRP prepreg was used while as an inorganic filler, AlN (aluminum nitride powder for filler use made by Tokuyama Corporation, average particle size D50=40 μm, thermal conductivity=200 W/(m·K)) or SiC (made by Shinano Electric Refining, average particle size D50=30 μm, thermal conductivity=270 W/(m·K)) was used. Note that, the average particle size and thermal conductivity of the inorganic filler are the respective catalog values. Predetermined amounts of the resin material and inorganic filler were charged into a container so as to obtain a content of inorganic filler such as shown in the following Table 1-1 and Table 1-2 (vol % of inorganic filler with respect to volume of total solid content) and were stirred at 200 rpm×1 minute to obtain a homogeneous mixed state. Note that, at the time of stirring, the viscosity at 25° C. was measured at various times by an E-type viscometer TVE-35H made by Toki Sangyo Co., Ltd. and the viscosity of the treatment solution was made 1 to 30 Pa·s in range. Note that, at the time of adjustment of the viscosity, as the solvent (acetone, made by Kanto Kagaku) was used.

The obtained treatment solution was coated on the metal member by a bar coater to a thickness such as shown in Table 1-1 and Table 1-2.

Stacked Assembly

Two metal members coated with the treatment solution were prepared. Stacked assemblies having layer structures of the metal member/treatment solution/epoxy resin CFRP prepreg×9 layers/treatment solution/metal member were prepared.

Conditions of Hot Pressing Steps

In the examples of the following Table 1-1 and Table 1-2, the treatment temperature of the first hot pressing step was made 60° C. and 1.0 MPa of pressure was applied for 30 minutes. Further, the treatment temperature of the second hot pressing step was made 150° C. and 1.5 MPa of pressure was applied for 30 minutes. Due to this, a test material of a metal-CFRP composite was obtained.

Furthermore, the material used in Example 3 of Table 1-1 was used to obtain each test material of the metal-CFRP composite while changing the hot pressing conditions such as shown in Table 1-3. Further, the thicknesses of the layers and the contents of the inorganic filler and carbon fiber were adjusted to become the same as in Example 3. In Comparative Example 7 and Comparative Example 8, a single stage of hot pressing step was used to manufacture the test material of the metal-CFRP composite.

Further, each obtained test material was examined at its cross-section by an optical microscope to determine the interface of the resin layer and CFRP layer, then a region of a width of the average particle size of the inorganic filler from such an interface in the direction of the resin layer was determined and the number density ($mm^2$) of the inorganic filler present at the region as calculated. Even when only part of a particle of the inorganic filler was present in the region, it was counted in the number as present in the region. The obtained number density of the inorganic filler is shown in Table 1-1 to Table 1-3.

Content of Evaluation

Each obtained test material was calculated for volume percent (vol %) from the thickness of each layer. Each test material was measured for thermal conductivity, corrosion resistance, and flexural strength.

Thermal Conductivity

In a width 12.5 mm×length 150 mm test material of each metal-CFRP composite shown in the following Tables 1-1 to 1-3, a part up to 25 mm from one end in the length direction was attached to a copper sheet using carbon tape (carbon double-sided tape for SEM use made by Nisshin Emi Co., Ltd.) A thermocouple was attached to a part up to 25 mm from the other end part (metal member at opposite side of metal member attached to copper sheet) to thereby obtain a measurement sample. The obtained measurement sample was placed on a hot plate heated to 160° C. (ceramic hot plate made by As One Corporation) and measured for temperature by the thermocouple 90 seconds and 600 seconds after placement. That is, in this test, for example, the metal member positioned at the bottom side in the figure in the measurement sample having a layer structure such as shown in FIG. 1B is made to contact the hot plate. A thermocouple is attached to the metal member positioned at the upper side in the figure. On top of this, the heat transfer through the route of the metal member→resin layer→CFRP layer→resin layer→metal member is measured by the thermocouple.

A case where, under the above such measurement conditions, the temperature measured by a thermocouple after 90 seconds after placement was 40° C. or more and the temperature after 600 seconds after placement was 60° C. or more was deemed as passing.

Corrosion Resistance

A width 12.5 mm×length 150 mm test material of each metal-CFRP composite shown in the following Tables 1-1 to 1-3 was immersed in a 5% sodium chloride aqueous solution for 15 days. The decrease in mass from before to after immersion was measured. A case where the reduction in mass was 6% or less based on the mass of the test material before immersion was deemed as passing.

Flexural Test

Based on JIS K 7074:1988, each obtained metal-CFRP composite was measured for mechanical properties. More specifically, a test material of a width 12.5 mm×length 150 mm metal-CFRP composite was pressed by a distance between supports of 8 mm and a pressing speed of 5 mm/min. The flexural strength [MPa] at that time was measured. A case where the obtained flexural strength was 530 MPa or more was deemed as passing.

The obtained results are shown together in the following Table 1-1, Table 1-2, and Table 1-3.

TABLE 1-1

| | Composite as whole | | | Metal member | | CFRP layer | | | | Resin layer | |
|---|---|---|---|---|---|---|---|---|---|---|---|
| | Metal member (vol %) | CFRP layer (vol %) | Resin layer (vol %) | Type | Thickness (mm) | Type of reinforcing fiber | Type of matrix resin | Thermal conductivity of carbon fiber (W/m·K) | Thickness (mm) | Fiber content (vol %) | Type of resin |
| Comp. Ex. 1 | 27.7 | 72.3 | 0.0 | Steel sheet (TFS) | 0.18 | Pitch-based carbon reinforcing fiber | Epoxy | 500 | 0.94 | 55.1 | None |
| Comp. Ex. 2 | 24.0 | 62.7 | 13.3 | Steel sheet (TFS) | 0.18 | Pitch-based carbon reinforcing fiber | Epoxy | 500 | 0.94 | 55.1 | Epoxy |
| Comp. Ex. 3 | 24.0 | 62.7 | 13.3 | Steel sheet (TFS) | 0.18 | Pitch-based carbon reinforcing fiber | Epoxy | 500 | 0.94 | 55.1 | Epoxy |
| Ex. 1 | 24.0 | 62.7 | 13.3 | Steel sheet (TFS) | 0.18 | Pitch-based carbon reinforcing fiber | Epoxy | 500 | 0.94 | 55.1 | Epoxy |
| Ex. 2 | 24.0 | 62.7 | 13.3 | Steel sheet (TFS) | 0.18 | Pitch-based carbon reinforcing fiber | Epoxy | 500 | 0.94 | 55.1 | Epoxy |
| Ex. 2-2 | 46.7 | 43.9 | 9.3 | Al alloy sheet | 0.50 | Pitch-based carbon reinforcing fiber | Epoxy | 500 | 0.94 | 55.1 | Epoxy |
| Ex. 2-3 | 24.0 | 62.7 | 13.3 | Steel sheet (TFS) | 0.18 | Pitch-based carbon reinforcing fiber | Epoxy | 500 | 0.94 | 55.1 | Epoxy |
| Ex. 2-4 | 24.0 | 62.7 | 13.3 | Steel sheet (TFS) | 0.18 | PAN-based carbon reinforcing fiber | Epoxy | 152 | 0.94 | 55.1 | Epoxy |
| Ex. 2-5 | 24.0 | 62.7 | 13.3 | Steel sheet (TFS) | 0.18 | Pitch-based carbon reinforcing fiber | phenoxy | 500 | 0.94 | 55.1 | phenoxy |
| Ex. 2-6 | 24.0 | 62.7 | 13.3 | Steel sheet (TFS) | 0.18 | Pitch-based carbon reinforcing fiber | Epoxy | 500 | 0.94 | 55.1 | phenoxy |
| Ex. 2-7 | 24.0 | 62.7 | 13.3 | Steel sheet (TFS) | 0.18 | Pitch-based carbon reinforcing fiber | poly propylene | 500 | 0.94 | 55.1 | Epoxy |
| Ex. 3 | 24.0 | 62.7 | 13.3 | Steel sheet (TFS) | 0.18 | Pitch-based carbon reinforcing fiber | Epoxy | 500 | 0.94 | 55.1 | Epoxy |
| Ex. 4 | 24.0 | 62.7 | 13.3 | Steel sheet (TFS) | 0.18 | Pitch-based carbon reinforcing fiber | Epoxy | 500 | 0.94 | 55.1 | Epoxy |
| Comp. Ex. 4 | 24.0 | 62.7 | 13.3 | Steel sheet (TFS) | 0.18 | Pitch-based carbon reinforcing fiber | Epoxy | 500 | 0.94 | 55.1 | Epoxy |
| Comp. Ex. 5 | 0.0 | 100.0 | 0.0 | None | 0.00 | Pitch-based carbon reinforcing fiber | Epoxy | 500 | 0.94 | 55.1 | None |

| | Resin layer | | | | | | Evaluation | | | |
|---|---|---|---|---|---|---|---|---|---|---|
| | Tg or Tm (°C.) | Thickness (mm) | Type of inorganic filler | Inorganic filler thermal conductivity (W/m·K) | Inorganic filler average particle size (μm) | Inorganic filler content (vol %) | Inorganic filler number density (/mm2) | Thermal conductivity (surface temperature) after 90 sec | Thermal conductivity (surface temperature) after 600 sec | Corrosion resistance (%) | Flexural strength (MPa) |
| Comp. Ex. 1 | — | 0.00 | None | None | None | 0 | 0 | 48.5 | 75.8 | 9.2 | 655 |
| Comp. Ex. 2 | 135 | 0.10 | None | None | None | 0 | 0 | 38.1 | 58.5 | 4.3 | 620 |

TABLE 1-1-continued

| | Tg or Tm (°C) | Thickness (mm) | Type of inorganic filler | Inorganic filler thermal conductivity (W/m·K) | Inorganic filler average particle size (μm) | Inorganic filler content (vol %) | Inorganic filler number density (/mm2) | Thermal conductivity (surface temperature) after 90 sec | Thermal conductivity (surface temperature) after 600 sec | Corrosion resistance (%) | Flexural strength (MPa) |
|---|---|---|---|---|---|---|---|---|---|---|---|
| Comp. Ex. 3 | 135 | 0.10 | AlN | 200 | 40 | 5.3 | 295 | 38.0 | 58.5 | 4.0 | 600 |
| Ex. 1 | 135 | 0.10 | AlN | 200 | 40 | 10.1 | 350 | 45.0 | 72.0 | 3.9 | 595 |
| Ex. 2 | 135 | 0.10 | AlN | 200 | 40 | 18.4 | 400 | 50.3 | 74.2 | 3.8 | 575 |
| Ex. 2-2 | 135 | 0.10 | AlN | 200 | 40 | 18.4 | 440 | 55.3 | 80.2 | 5.5 | 535 |
| Ex. 2-3 | 135 | 0.10 | SiC | 270 | 30 | 18.4 | 300 | 52.0 | 77.5 | 3.2 | 534 |
| Ex. 2-4 | 135 | 0.10 | AlN | 200 | 40 | 18.4 | 450 | 40.1 | 60.1 | 3.1 | 863 |
| Ex. 2-5 | 85 | 0.10 | AlN | 200 | 40 | 18.4 | 440 | 50.3 | 74.0 | 3.5 | 590 |
| Ex. 2-6 | 85 | 0.10 | AlN | 200 | 40 | 18.4 | 400 | 50.0 | 73.0 | 3.3 | 583 |
| Ex. 2-7 | 135 | 0.10 | AlN | 200 | 40 | 18.4 | 378 | 50.1 | 72.5 | 3.2 | 530 |
| Ex. 3 | 135 | 0.10 | AlN | 200 | 40 | 31.0 | 500 | 48.1 | 75.5 | 3.9 | 555 |
| Ex. 4 | 135 | 0.10 | AlN | 200 | 40 | 40.3 | 514 | 47.8 | 76.0 | 3.1 | 537 |
| Comp. Ex. 4 | 135 | 0.10 | AlN | 200 | 40 | 52.9 | 600 | 48.8 | 76.4 | 3.2 | 515 |
| Comp. Ex. 5 | — | 0.00 | None | None | None | 0 | 0 | 52.8 | 66.7 | 0.0 | 520 |

TABLE 1-2

| | Composite as whole | | | Metal member | | CFRP layer | | | | Resin layer | |
|---|---|---|---|---|---|---|---|---|---|---|---|
| | Metal member (vol %) | CFRP layer (vol %) | Resin layer (vol %) | Type | Thickness (mm) | Type of reinforcing fiber | Type of matrix resin | Thermal conductivity of carbon fiber (W/m·K) | Thickness (mm) | Fiber content (vol %) | Type of resin |
| Ex. 5 | 54.5 | 15.2 | 30.3 | Steel sheet (TFS) | 0.18 | Pitch-based carbon reinforcing fiber | Epoxy | 500 | 0.10 | 55.1 | Epoxy |
| Ex. 6 | 41.9 | 34.9 | 23.3 | Steel sheet (TFS) | 0.18 | Pitch-based carbon reinforcing fiber | Epoxy | 500 | 0.30 | 55.1 | Epoxy |
| Ex. 7 | 16.3 | 74.7 | 9.0 | Steel sheet (TFS) | 0.18 | Pitch-based carbon reinforcing fiber | Epoxy | 500 | 1.65 | 55.1 | Epoxy |
| Ex. 8 | 12.3 | 80.8 | 6.9 | Steel sheet (TFS) | 0.18 | Pitch-based carbon reinforcing fiber | Epoxy | 500 | 2.36 | 55.1 | Epoxy |
| Ex. 9 | 9.6 | 85.1 | 5.3 | Steel sheet (TFS) | 0.18 | Pitch-based carbon reinforcing fiber | Epoxy | 500 | 3.20 | 55.1 | Epoxy |
| Ex. 10 | 58.4 | 34.3 | 7.3 | Steel sheet (GA) | 0.80 | Pitch-based carbon reinforcing fiber | Epoxy | 500 | 0.94 | 55.1 | Epoxy |
| Ex. 11 | 44.1 | 46.1 | 9.8 | Steel sheet (EG) | 0.45 | Pitch-based carbon reinforcing fiber | Epoxy | 500 | 0.94 | 55.1 | Epoxy |

| | Resin layer | | | | | | | Evaluation | | | |
|---|---|---|---|---|---|---|---|---|---|---|---|
| | Tg or Tm (°C) | Thickness (mm) | Type of inorganic filler | Inorganic filler thermal conductivity (W/m·K) | Inorganic filler average particle size (μm) | Inorganic filler content (vol %) | Inorganic filler number density (/mm2) | Thermal conductivity (surface temperature) after 90 sec | Thermal conductivity (surface temperature) after 600 sec | Corrosion resistance (%) | Flexural strength (MPa) |
| Ex. 5 | 135 | 0.10 | AlN | 200 | 40 | 31.0 | 500 | 40.1 | 62.0 | 4.0 | 556 |
| Ex. 6 | 135 | 0.10 | AlN | 200 | 40 | 31.0 | 495 | 40.0 | 65.0 | 3.8 | 555 |
| Ex. 7 | 135 | 0.10 | AlN | 200 | 40 | 31.0 | 480 | 48.5 | 73.7 | 4.0 | 554 |
| Ex. 8 | 135 | 0.10 | AlN | 200 | 40 | 31.0 | 475 | 42.3 | 78.6 | 4.5 | 554 |

TABLE 1-2-continued

| | | | | | | | | | | | |
|---|---|---|---|---|---|---|---|---|---|---|---|
| Ex. 9 | 135 | 0.10 | AlN | 200 | 40 | 31.0 | 475 | 49.7 | 90.1 | 4.8 | 534 |
| Ex. 10 | 135 | 0.10 | AlN | 200 | 40 | 31.0 | 480 | 40.1 | 61.1 | 4.8 | 534 |
| Ex. 11 | 135 | 0.10 | AlN | 200 | 40 | 31.0 | 490 | 43.2 | 73.1 | 4.8 | 534 |

TABLE 1-3

| | First hot pressing step | | | Second hot pressing step | | | Resin layer Inorganic filler | Evaluation Thermal conductivity | Thermal conductivity | | |
|---|---|---|---|---|---|---|---|---|---|---|---|
| | Treatment temperature (° C.) | Holding time (min) | Pressure (MPa) | Treatment temperature (° C.) | Holding time (min) | Pressure (MPa) | number density (/mm²) | (surface temperature) after 90 sec | (surface temperature) after 600 sec | Corrosion resistance (%) | Flexural strength (MPa) |
| Ex. 12 | 80.0 | 30.0 | 0.5 | 130.0 | 30.0 | 0.5 | 340 | 49.8 | 72.0 | 3.8 | 572 |
| Comp. Ex. 6 | 40.0 | 30.0 | 0.5 | 130.0 | 30.0 | 0.5 | 272 | 39.0 | 57.0 | 3.2 | 560 |
| Comp. Ex. 7 | — | — | — | 150.0 | 30.0 | 1.5 | 254 | 30.0 | 50.0 | 9.2 | 560 |
| Comp. Ex. 8 | — | — | — | 150.0 | 30.0 | 1.5 | 85 | 39.0 | 59.0 | 4.0 | 495 |

As clear from the above Table 1-1 and Table 1-2, it will be understood that the test materials corresponding to the examples of the present invention exhibit excellent thermal conductivity, corrosion resistance, and flexural strength. Further, as clear from the above Table 1-1 to Table 1-3, it will be understood that the test materials obtained using a method corresponding to the examples of the present invention exhibit excellent thermal conductivity, corrosion resistance, and flexural strength.

Above, preferred embodiments of the present invention were explained in detail while referring to the attached drawings, but the present invention is not limited to these examples. A person having ordinary knowledge in the field of art to which the present invention belongs clearly could conceive of various modifications or corrections in the scope of the technical idea described in the claims. These are understood as naturally falling in the technical scope of the present invention.

REFERENCE SIGNS LIST 1 composite of metal and carbon-fiber-reinforced plastic
10 metal member
20 resin layer
30 CFRP layer
201 resin composition
202 inorganic filler
301 matrix resin
302 carbon reinforcing fiber

The invention claimed is:

1. A composite of metal and carbon-fiber-reinforced plastic comprising:
a predetermined metal member,
a resin layer positioned at a surface of at least part of said metal member and containing an inorganic filler having a thermal conductivity of 20 W/(m·K) or more, and
carbon fiber reinforced plastic positioned on said resin layer and containing a predetermined matrix resin and carbon reinforcing fiber present in said matrix resin, said carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range,
a content of said inorganic filler in said resin layer being 10 to 45 vol % in range with respect to a total volume of said resin layer,
a number density of said inorganic filler present in a region of a width X μm from an interface of said resin layer and said carbon fiber reinforced plastic in a direction of said resin layer being 300/mm² or more where X μm is an average particle size of said inorganic filler.

2. The composite of metal and carbon-fiber-reinforced plastic according to claim 1, wherein said resin layer is mainly comprised of the same main components as said matrix resin,
wherein a ratio of components in the resin layer is the same or different from a ratio of components in the matrix resin, and
wherein the main component is a component contained in 50 pts,mass or more in 100 pts,mass of the total resin components.

3. The composite of metal and carbon-fiber-reinforced plastic according to claim 1, wherein said resin layer has a thermosetting resin as a main component.

4. The composite of metal and carbon-fiber-reinforced plastic according to claim 1, wherein said inorganic filler is any one of AlN, $Si_3N_4$, SiC, or $Al_2O_3$.

5. The composite of metal and carbon-fiber-reinforced plastic according to claim 1, wherein a ratio of said metal member with respect to a total volume of said composite of metal and carbon-fiber-reinforced plastic is 9 to 65 vol % in range, a ratio of said carbon fiber reinforced plastic is 20 to 90 vol % in range, a ratio of said resin layer is 1 to 25 vol % in range, and a total of the ratios of said metal member, said carbon fiber reinforced plastic, and said resin layer is 100 vol %.

6. The composite of metal and carbon-fiber-reinforced plastic according to claim 1, wherein
an average particle size of said inorganic filler is 1 to 100 μm in range, and
a thickness of said resin layer is 20 to 300 μm in range.

7. The composite of metal and carbon-fiber-reinforced plastic according to claim 1, wherein
said carbon reinforcing fiber is said pitch-based carbon reinforcing fiber, and a fiber content of said pitch-based carbon reinforcing fiber is 20 to 70 vol % with respect to a total volume of said carbon fiber reinforced plastic material.

8. The composite of metal and carbon-fiber-reinforced plastic according to claim 1, wherein
said carbon reinforcing fiber is said PAN-based carbon reinforcing fiber, and
a fiber content of said PAN-based carbon reinforcing fiber is 20 to 65 vol % with respect to a total volume of said carbon fiber reinforced plastic material.

9. The composite of metal and carbon-fiber-reinforced plastic according to claim 1, wherein said metal member is a ferrous material.

10. The composite of metal and carbon-fiber-reinforced plastic according to claim 1, wherein
the composite is used for manufacturing a heat transfer member, and
said carbon fiber reinforced plastic is used as a heat transfer path transferring heat from said metal member side.

11. A method for manufacturing a composite of metal and carbon-fiber-reinforced plastic comprising
coating a surface of a predetermined metal member with a treatment solution which contains a predetermined resin material and inorganic filler having a thermal conductivity of 20 W/(m·K) or more and which has a viscosity at 20 to 40° C. of 1 to 30 Pa·S,
placing a carbon fiber reinforced plastic prepreg which contains a predetermined matrix resin and carbon reinforcing fiber present in said matrix resin on said metal member after being coated with said treatment solution, said carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, to obtain a stacked assembly,
performing a first hot pressing step of applying to said stacked assembly 0.5 to 2.0 MPa in pressure at a predetermined range of treatment temperature for 30 to 60 minutes,
performing a second hot pressing step of applying to said stacked assembly after said first hot pressing step 0.5 to 2.0 MPa in pressure at a predetermined range of treatment temperature for 30 to 120 minutes, and
making a content of said inorganic filler in said treatment solution 10 to 45 vol % in range with respect to a total volume of said treatment solution,
a treatment temperature of said first hot pressing step being (Tg-80) to (Tg-50)° C. in range in the case where said resin material in said treatment solution is a noncrystalline thermosetting resin, where Tg [° C.] is a glass transition temperature of the resin after curing, and being (Tm) to (Tm+20)° C. in range in the case where said resin material in said treatment solution is a crystalline thermosetting resin, where Tm [° C.] is a melting point of said crystalline resin,
a treatment temperature of said second hot pressing step being (Tg-20) to (Tg+50)° C. in range in the case where said resin material in said treatment solution is a noncrystalline thermosetting resin and being and being (Tm+25) to (Tm+50)° C. in range in the case where said resin material in said treatment solution is a crystalline thermosetting resin.

12. The method for manufacturing a composite of metal and carbon-fiber-reinforced plastic according to claim 11, further comprising
using said inorganic filler having an average particle size of 1 to 100 μm in range and
making an amount of deposition of said treatment solution 25 to 630 g/m² in range.

13. A method for manufacturing a composite of metal and carbon-fiber-reinforced plastic comprising
coating a surface of a predetermined metal member with a resin sheet or a treatment solution which has a viscosity at 20 to 40° C. of 1 to 30 Pa·S, said resin sheet or said treatment solution contains a predetermined resin material and an inorganic filler having a thermal conductivity of 20 W/(m·K) or more,
placing a carbon fiber reinforced plastic prepreg which contains a predetermined matrix resin and carbon reinforcing fiber present in said matrix resin on said metal member after placing said resin sheet or said treatment solution, said carbon reinforcing fiber being at least one of pitch-based carbon reinforcing fiber having a thermal conductivity of 180 to 900 W/(m·K) in range or PAN-based carbon reinforcing fiber having a thermal conductivity of 100 to 200 W/(m·K) in range, to obtain a stacked assembly,
performing a first hot pressing step of applying to said stacked assembly 0.5 to 2.0 MPa in pressure at a predetermined range of treatment temperature for 30 to 60 minutes,
performing a second hot pressing step of applying to said stacked assembly after said first hot pressing step 0.5 to 2.0 MPa in pressure at a predetermined range of treatment temperature for 30 to 120 minutes, and
making a content of said inorganic filler in said resin sheet or said treatment solution 10 to 45 vol % in range with respect to a total volume of said resin sheet or said treatment solution,
a treatment temperature of said first hot pressing step being a temperature lower than a decomposition temperature and (Tg+100) to (Tg+200)° C. in temperature range in the case where said resin material in said resin sheet or in said treatment solution is a noncrystalline thermoplastic resin, where Tg [° C.] is a glass transition temperature of said resin material, and being a temperature lower than a decomposition temperature and (Tm) to (Tm+50)° C. in temperature range in the case where said resin material in said resin sheet or in said treatment solution is a crystalline thermoplastic resin, where Tm [° C.] is a melting point of said crystalline thermoplastic resin,
a treatment temperature of said second hot pressing step being Tg to (Tg+150)° C. in range in the case where said resin material in said resin sheet or in said treatment solution is a noncrystalline thermoplastic resin and Tm to (Tm+20)° C. in range in the case where said resin material in said treatment solution is a crystalline thermoplastic resin and being a temperature lower than a decomposition temperature, where Tm [° C.] is a melting point of said crystalline thermoplastic resin.

* * * * *